US006812470B2

(12) United States Patent
Sato

(10) Patent No.: US 6,812,470 B2
(45) Date of Patent: Nov. 2, 2004

(54) PHOTOSONOLYSIS OF TOXICS IN REACTOR WITH A METAL PARTITION

(75) Inventor: Chikashi Sato, Pocatello, ID (US)

(73) Assignee: Idaho State University, Pocatello, ID (US)

( * ) Notice: Subject to any disclaimer, the term of this patent is extended or adjusted under 35 U.S.C. 154(b) by 0 days.

(21) Appl. No.: 10/659,050

(22) Filed: Sep. 9, 2003

(65) Prior Publication Data

US 2004/0129892 A1 Jul. 8, 2004

Related U.S. Application Data

(63) Continuation-in-part of application No. 09/288,595, filed on Apr. 8, 1999, now Pat. No. 6,617,588.
(60) Provisional application No. 60/081,267, filed on Apr. 8, 1998.

(51) Int. Cl.$^7$ .............................................. B01D 53/00
(52) U.S. Cl. ................ 250/455.11; 210/748; 422/186.3
(58) Field of Search ........................... 250/455.11, 435, 250/436; 210/748, 763, 758; 422/186.3, 209, 186

(56) References Cited

U.S. PATENT DOCUMENTS

| | | | |
|---|---|---|---|
| 3,672,823 A | 6/1972 | Boucher | 21/84 R |
| 5,130,031 A | 7/1992 | Johnston | 210/748 |
| 6,309,611 B1 | 10/2001 | Tabatabaie-Raissi et al. | 422/186.3 |
| 6,617,588 B1 * | 9/2003 | Sato | 250/455.11 |

OTHER PUBLICATIONS

Toy & Stringham, "Ultrasonic Photolysis of Methyl Disulfide and Hexafluorobutadiene", 1984, *Journal of Fluorine Chemistry 25, pp 213–218.*
Sierka & Amy, "Catalytic Effects of Ultraviolet Light and/or Ultrasound on the Ozone Oxidation of Humic Acid and Trihalomethane Precursors", 1985, *Ozone Science & Engineering, vol. 7, pp. 47–62.*
Toy & Stringham, "Photosonosynthesis of 1,2,4–Tris(Methylthio)–3–H–Hexafluoro–n–Butane", 1985, *Journal of Fluorine Chemistry 29, pp 253–260.*
Toy, Carter & Passell, "Photosonochemical Decomposition of Aqueous 1,1,1–Trichloroethane", 1990, *Environmental Technology, vol. 11, pp. 837–842.*
Toy, Scheppers & Passell, "Photosonocatalysis on Decomposition of Some Organics in Aqueous Solutions", Apr. 27, 1990, 199$^{th}$ National Meeting of American Chemical Society, Report No. CONF–900402, pp. 384–387.
Johnston & Hocking, "Ultrasonically Accelerated Photocatalytic Waste Treatment", 1993, *Accelerated Photocatalytic Waste Treatment, pp. 106–118.*
Muzzoli, Chicca & Pinamonti, "Effects of Pulsed Ultrasound and Ultraviolet Radiation on Vitamin E and Olive Oil", 1994, *Proceedings of the Royal Society of Edinburgh, 102B, pp. 265–268.*

(List continued on next page.)

*Primary Examiner*—Kiet T. Nguyen
(74) *Attorney, Agent, or Firm*—Pedersen & Co., PLLC; Ken J. Pedersen; Barbara S. Pedersen

(57) ABSTRACT

The invention is a process and reactors designs for simultaneous ultraviolet light/ultrasound(UV/US) treatment of halogenated organic compounds contaminants in water. The reactors are preferably circular cylindrical reaction vessels that accept a central ultrasonic horn. UV light is provided by lamps placed generally parallel to the reactor walls. Or, UV light may be centrally provided in an immersion well near the ultrasonic horn. Also, preferably a hollow metal partition with a reactant flow-through hole is placed in the reactor between the UV light source and the ultrasonic horn. This way, simultaneous UV/US energy may be effectively provided to the reactors for the remediation of toxic compounds in the water in the reactors. Also, this way, compact and portable reactors may be constructed to permit mobile applications of the UV/US processes.

18 Claims, 13 Drawing Sheets

OTHER PUBLICATIONS

Macka, Semenkova & Kiss, "Decomposition of Cisplatin in Aqueous Solutions Containing Chlorides by Ultrasonic Energy and Light", Jun. 1994, *American Chemical Society and American Pharmaceutical Association, pp. 815–818.*

Sato, Wu, & Kirkpatrick and Hartenstein & Motes, "Photosonolysis of Chlorinated Volatile Organics in Aqueous Solution", 1997, Conference on Hazardous Wastes and Materials, pp. 1–19.

Modeling Tetrachloroethylene Decomposition in Photosonolysis Reactor published in 136/Journal of Environmental Engineering/Feb. 2003.

* cited by examiner

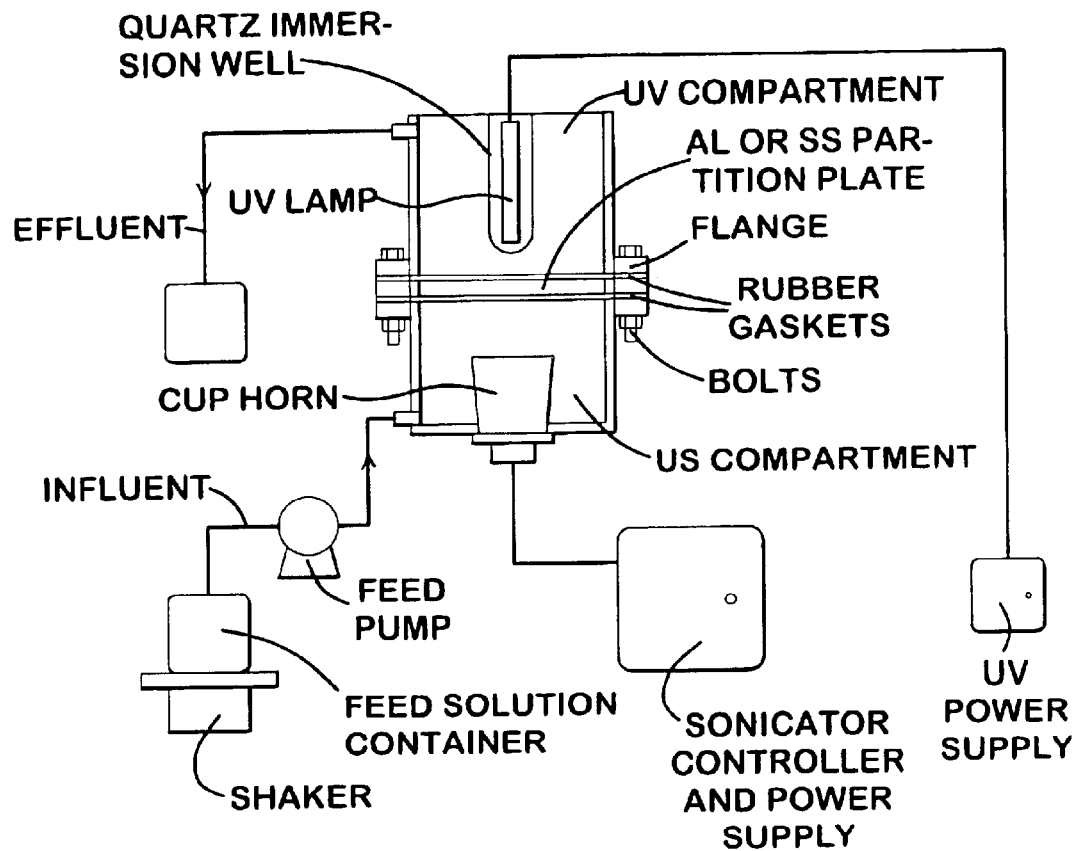
Fig. 10
THE UVUS REACTOR SYSTEM
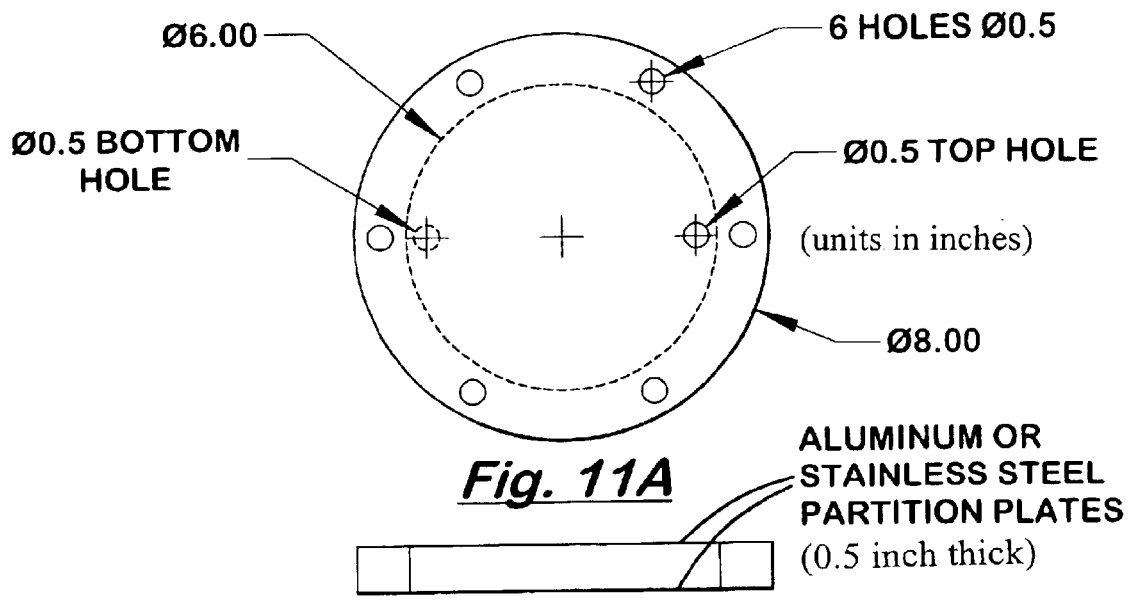
Fig. 11A
Fig. 11B

REACTOR EFFICIENCY (EUVUS) FOR THE
REMOVAL OF PCE AND TCE
(AL = ALUMINUM, SS = STAINLESS STEEL)

COMPARISON BETWEEN EUVUS AND EAD
FOR THE DECOMPOSITION OF PCE AND TCE

PHOTOSONOLYSIS OF TOXICS IN REACTOR WITH A METAL PARTITION

BACKGROUND OF THE INVENTION

1. Field of the Invention

This invention relates generally to remediation of toxic organic compounds in the aqueous phase. More specifically, this invention relates to processes and reaction vessels that use simultaneously ultraviolet light (UV) and ultrasonic waves (US) to destroy organic pollutants, typically halogenated organic compounds in water.

2. Related Art

Widespread water contamination with, for example, chlorinated volatile organic compounds (VOCs) has motivated research on photosonocatalysis technology for destroying VOCs, as an alternative to currently available remediation technologies such as air stripping and carbon adsorption processes.

Researchers have studied the effects of simultaneous and combined treatment of materials with ultraviolet light ("photolysis") and ultrasonic waves ("sonolysis").

Photolysis is a photochemical cleavage reaction initiated by the action of radiant energy in the UV/visible region of the electromagnetic spectrum. When light hits the molecule and the molecule absorbs its energy, the energy content of the molecule is increased and the molecule reaches an excited electron state. Photolysis is one deactivation process in which the unstable excited state molecule comes down to a stable ground-level energy state.

Photolysis occurs competitively with the radiation and radiationless reactions. In the former reaction, the molecules's extra energy is released through emission of light (e.g., fluorescence). In the latter reaction, its extra energy is converted to thermal energy and dissipated. The absorption of light energy by the molecule may occur directly or indirectly. When the molecule itself directly adsorbs light energy and is degraded, the reaction is direct photolysis, while light energy is transferred from other substances, the resulting reaction is indirect or sensitized photolysis. When photons of light strike a semiconductor, they are either absorbed or scattered. The absorbed photons with energy greater than or equal to the semiconductor band gap energy excite electrons from the valence band to the conduction band. The excitation generates electron-hole pairs ($e^-+h^+$) on semiconductors, which can either recombine and release heat, or cause oxidation and reduction reactions by charge transfer to species adsorbed to the semiconductor (Lau, 1996).

Sonolysis is a physical/chemical reaction initiated by implosion of cavitation bubbles in liquid, induced by ultrasound. Ultrasound can create powerful rarefaction waves to develop a negative pressure in liquid. If the waves are powerful enough to overcome the intermolecular forces of bonds in liquid, the liquid molecules will be torn apart from each other to form microbubbles in liquid. The cavitation bubbles are formed at the weak spots in the liquid. Once a microbubble is formed, it rapidly grows until it reaches the critical size at which the bubble can no longer sustain itself and results in an implosion instantaneously releasing a large amount of energy (Bhatnagar and Cheung, 1994).

The energy generated by the compression of gas and vapor inside is released as intense heat at a local hot spot. Suslick (1990) reported that these hot spots (imploding bubbles) would reach temperature of 5000° C., pressure of 500 atmospheres, and heating and cooling rates greater than $10^9$ K/sec. Thus, the reaction that takes place in aqueous solution may be direct bond cleavage, or thermal reaction similar to combustion. The extreme conditions may also produce reactive species (e.g., $H_2O_2$., $HO_2.H$, .OH) in aqueous solution, and result in hydrolysis and oxidation-reduction reactions with these species.

Photosonolysis is the use of photolysis and sonolysis in combination. Initial studies on the use of photosonolysis were reported by Toy and Stringham (1984, 1985). They used ultraviolet light (UV) and ultrasonic waves (US) for the synthesis of 1,2,4-tris (methylthio)-3-H-hexafluoro-n-butane from methyl disulfide and hexafluorobutadiene. Photosonolysis was later applied in numerous additional synthetic applications, and has also been applied to polymer degradations (Toy and Stringham, 1985; Toy et al., 1990).

Toy and Stringham's photosonosynthesis work has been expanded by other researchers to the applications to waste remediation technologies. Sierka and Amy (1985) studied the composite effects of ultraviolet light (UV), ultrasound (US), and ozone oxidation ($O_3$) to reduce the trihalomethane formation potential and maximize the destruction of non-volatile total organic carbons. They found that concurrent use of UV, US, and ozone provided the most effective combination in the performed experiments.

Johnston and Hocking (1991, 1993) studied the combined use of UV (with 0.5–2 g/L $TiO_2$) and ultrasonic irradiation to degrade various chlorinated organics including pentachlorophenol (PCP, $2.4\times10^{-4}$ M); 3-chlorobiphenyl (PCB, $4\times10^{-4}$ M); 2,4-dichlorophenol (2,4-DCP, $1\times10^{-3}$ M); and 4-chlorophenol (4-CP). The chlorinated compounds were more rapidly degraded by the combination of ultrasound and ultraviolet light irradiation than with any other combination (i.e., UV or US treatment with or without $TiO_2$) studied.

Toy et al. (1990) studied photosonocatalysis on decomposition of ethylene glycol and urea in aqueous solutions, and reported that photosonocatalytic decomposition is more aggressive than with either sonolysis or photolysis individually. Toy et al. (1990) also performed experiments on the photosonochemical decomposition of aqueous 1,1,1-trichloroethane (TCA), and reported that the combined use of photolysis and sonolysis causes a greater decomposition than if each technique were used separately.

Muzzoli et al. (1994) studied the effects of ultrasound and ultraviolet radiation on vitamin E and its pharmacological excipient, olive oil. The vitamin E appeared to be inactivated and behaved as a radical species, while olive oil appears unaffected by treatment either with ultrasound or with ultraviolet radiation.

Other inventors have developed methods and reactors for carrying out these treatments on liquids. See, for example, U.S. Pat. No. 3,672,823 (Boucher, issued Jun. 27, 1972), and U.S. Pat. No. 5,130,031 (Johnston, issued Jul. 14, 1992).

Still, there is a need for an easily constructed, simply operated, portable UV/US reactor design. Also, there is still a need for such a UV/US reactor design with increased flexibility and capability of responding effectively to variable water flow and quality conditions without the need for necessarily added chemicals or catalysts. Also, there is a need for a process to destroy halogenated organic pollutants using UV/US. This invention addresses these needs.

SUMMARY OF THE INVENTION

The present invention is a process and reactors for simultaneous ultraviolet light/ultrasound (UV/US) treatment of pollutants (e.g., halogenated organic compounds) in water.

This process and these reactors use an advanced oxidation process (AOP) for the treatment of waters (e.g., surface water, groundwater). The process and reactors are designed to combine photolysis/photocatalysis and sonolysis, induced by ultraviolet light (UV) with/without photocatalyst (e.g., $TiO_2$) and ultrasound (US), respectively. The process and reactors are preferably circular, cylindrical-shaped reaction vessels that accept a central ultrasonic horn. UV light is provided by lamps placed generally parallel to the reactor walls, either external to the walls when a material transparent to UV is used for the reactor walls, or centrally provided in a transparent immersion well. Between, for example, the UV immersion well near the top of the reactor, and the ultrasonic horn near the bottom of the reactor, a horizontal, hollow metal partition with reactant flow-through holes is installed. This way, simultaneous UV/US energy may be effectively provided to the reactors for the remediation of pollutants in the water in the reactors. Also, this way, compact and portable reactors may be constructed to permit mobile applications of the UV/US processes. Because the units may be made mobile, they can be used for military applications, for remote or temporary communities or for emergency responses, as after natural disasters or accidental contaminations of water supplies.

BRIEF DESCRIPTION OF THE DRAWINGS

FIGS. 4B-a and 4B-b are side and top view schmatic depictions, respectively, for another embodiment of the flow-through photosono reactor of the present invention.

FIG. 10 is a schematic depiction of a flow-through photosono reactor embodiment with a horizontal, hollow metal partition.

FIGS. 11A and B are top and side detail views, respectively, of the embodiment of the metal partition of FIG. 10.

DESCRIPTION OF THE PREFERRED EMBODIMENTS

Figure 1A:
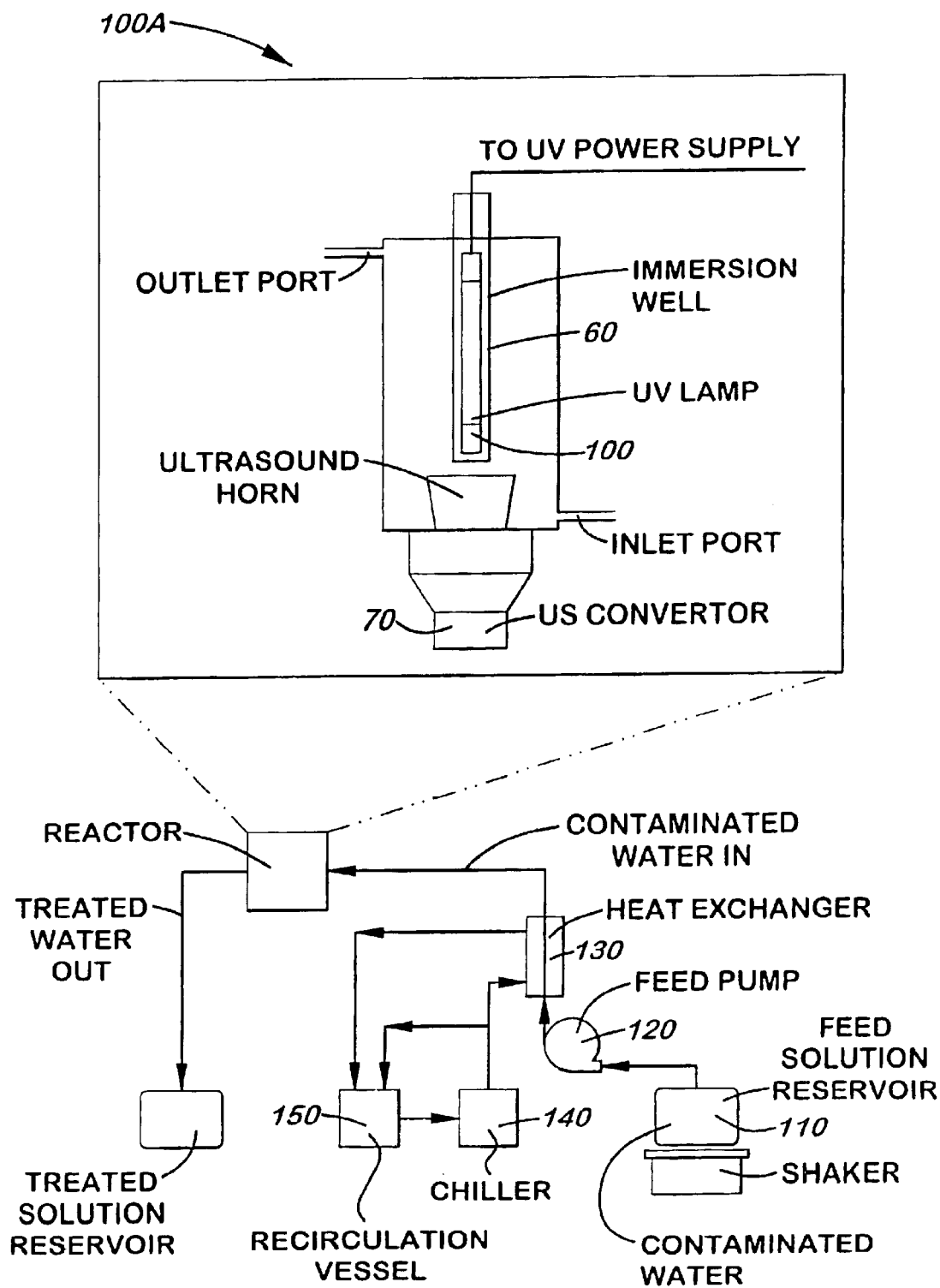
FIGS. 1(A–B) are schematic diagrams of two embodiments of the present invention, showing the systems in which the present invention is used.
Figure 1B:
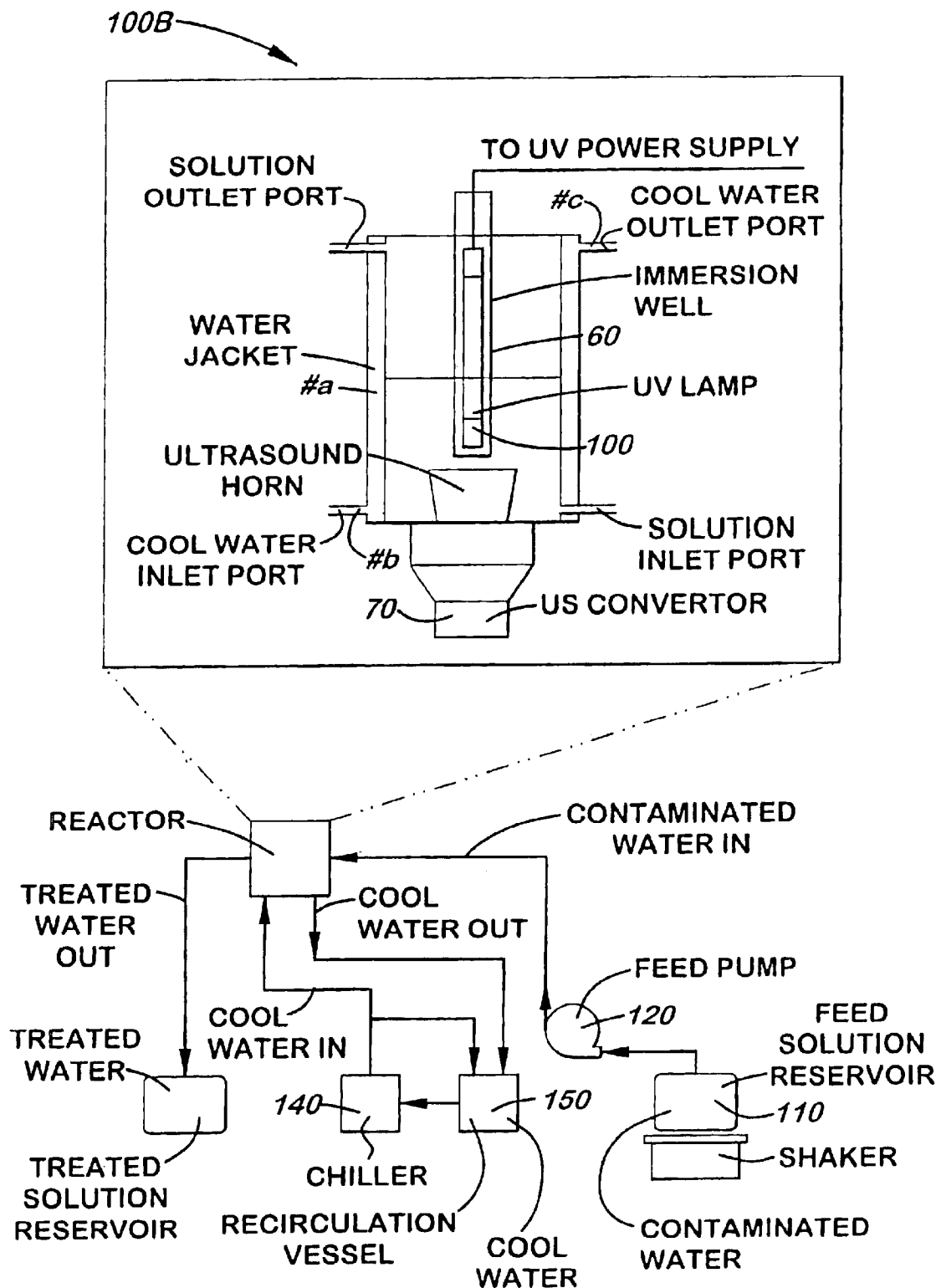

As shown in FIGS. 1A–B, the present invention is a UV/US reactor primarily for the remediation of toxic organic compounds in the aqueous phase. By simultaneously exposing the toxic organic compounds to both ultraviolet light and ultrasonic waves, the compounds are remediated into less toxic and nontoxic compounds.

FIG. 1A shows a general schematic diagram of one embodiment of the invented process and apparatus. Contaminated water (e.g., VOC aqueous solution) stored in a container 110 is pumped, using a pump 120, into a heat exchanger 130. Cooled water (preferably 10±5° C.) from chiller 140 is supplied to the heat exchanger 130 and recirculated through a recirculation system and stored in a vessel 150. This results in the temperature of the contaminated solution being reduced to preferably 10±5° C. This cooled contaminated solution is then processed through this embodiment of the present invention 100A.

FIG. 1B also shows a general schematic diagram for another embodiment of the invented process and apparatus. Contaminated water (e.g., VOC aqueous solution) stored in a container 110 is pumped, using a pump 120, into the present invention 100B. Cooled water (preferably 10±5° C.), cooled by a chiller 140, is supplied to a water jacket #a of the reactor from an inlet port #b, removed from an outlet port #c, and recirculated through a recirculation system and vessel 150. This results in the reactor temperature being maintained to preferably 20±5° C.

The basic UV/US reactor generally comprises a quartz or equivalent photo-reaction vessel, UV lamp(s), and an ultrasonic (US) liquid processor. The four, preferred, basic UV/US reactor designs according to the present invention are described in detail below. The preferred design of these four is the Type-3A and B reactor(s) (shown in FIGS. 4A–B).

The reactors may be made by conventional construction techniques with conventional materials. Scaled-up versions of the reactors may be designed by conventional engineering techniques. Components, equipment and accessories for scaled-up designs may be obtained from commercial vendors or custom-designed by conventional techniques. Preferably, the scaled-up designs will be modular units with accompanying inventory tanks, pumps, compressors, if necessary, separator vessels, level, flow and pressure controllers, electrical power supply and analytical instruments on a truck body or trailer for transport to the application site.

For experimental work, the preferred ultrasonic liquid processor is a Model XL2020, Misonix Inc. processor for a source of ultrasound. This processor is used to produce ultrasonic waves of 20-kHz frequency, preferably conducted in a pulse (5-sec on/off) mode. The XL2020 sonicator is capable of delivery 550 W of ultrasonic power.

1. Batch System Reactor a. The "Type-1" Reactor

Figure 2:
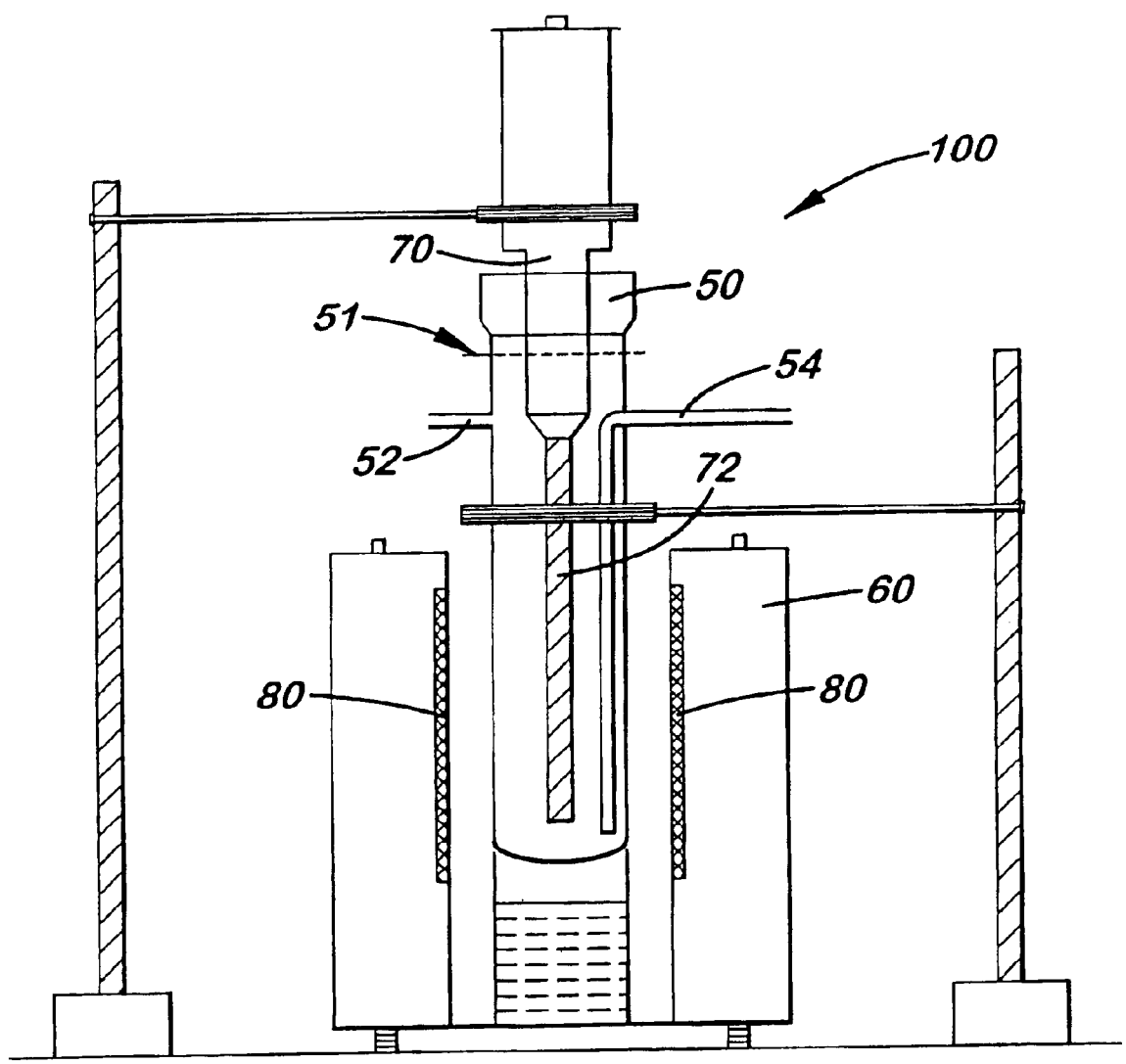
FIG. 2 is a schematic depiction for the batch photosono reactor embodiment of the present invention.

The preferred embodiment of the Type-1 reactor system is a batch system, as shown in FIG. 2. For experimental work, this reactor system 100 comprises of a quartz reaction vessel 50, a photochemical reactor chamber 60 (such as a Rayonet Photochemical Mini-Reactor Model RMR-600), and an ultrasonic liquid processor or "sonicator" (such as the preferred Misonix Model 2020) that has a ½-inch diameter titanium horn tip with a flat radiating surface. If no cap, which is optional, is placed on the reaction vessel 50, this permits background loss of volatile constituents (such as tetrachloroethylene ("PCE"), for example) in the reactor.

The quartz reaction vessel 50 is custom built with the following preferred specifications: a height of 317.50 mm, an inner diameter of 76.20 mm, inlet 52 and outlet 54 tubes of 4-mm diameter and a height of 241.30 mm from the reactor bottom. Solution to be treated is preferably placed within the reaction vessel 50 to a solution level 51, thereby resulting in a 1-liter open photosono reactor, when no cap, which is optional, is placed on the reaction vessel.

The input 52 and output 54 tubes are used to facilitate recirculation of the solution and keep the $TiO_2$ particles in suspension when $TiO_2$ powder is added. Such recirculation is preferably done by a peristaltic pump, such as a Flex-Flow model 7553-70, having a recirculation rate of 250 mL min$^{-1}$. It is preferred that the temperature of the solution be kept at 10±5° C. through the use of a chiller, as shown in FIG. 1.

The sonicator horn tip 72 is submerged into the quartz reactor vessel 50 placed inside the photoreactor chamber 60. The contaminated solution to be treated is placed within the quartz reaction vessel 50. The preferred photo-reactor 80 is placed outside the quartz reactor vessel 50. This photoreactor 80 contains light sources (4 watts per lamp, 32 watts total), power consumption of about one ampere per lamp at 110/120 volts (50/60 Hz A.C.).

Thus, the solution to be treated is UV-irradiated from UV radiation from the outside of the reactor vessel (the photoreactor), and the solution is exposed to ultrasonic (US) waves from within the reactor vessel (from the submerged sonicator horn tip).

The photoreactor's UV lamps are preferably turned on for at least 15–30 minutes before the contaminated solution is added to the reactor vessel. This 15–30 minutes warm-up period allows the lamps to reach a standard operating temperature. A cooling system comprising an internal fan and an external air source are also preferably employed to keep the lamps from overheating.

2. Flow-Through Reactors

The preferred flow-through reactors comprise a reaction vessel, a UV lamp(s), and an ultrasonic liquid processor (e.g., Misonix Model 2020). This is a closed vessel, designed for a continuous flow mode.

a. The "Type-2" Reactor

Figure 3:
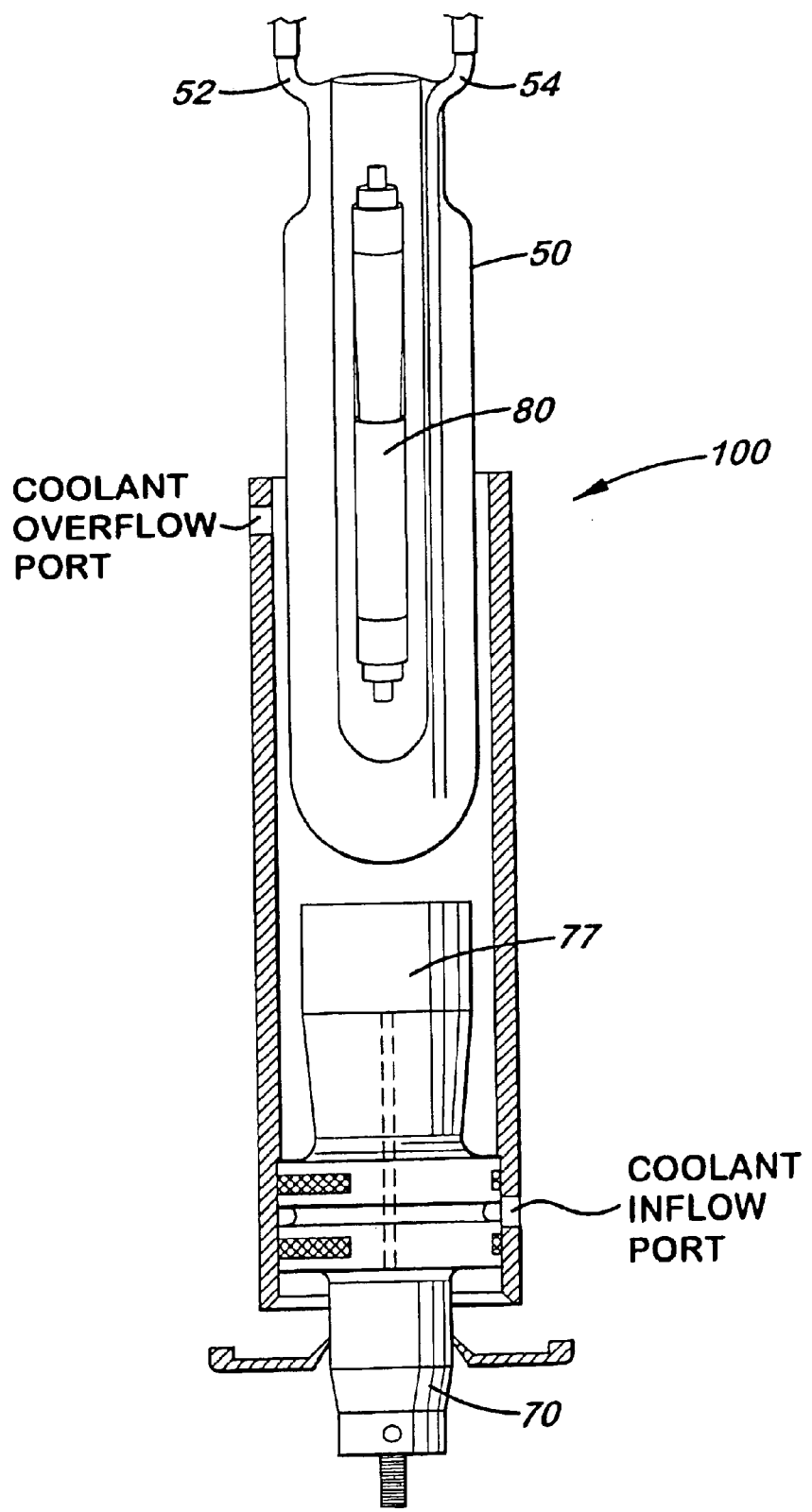
FIG. 3 is a schematic depiction for one embodiment of the flow-through photosono reactor of the present invention.

Referring to FIG. 3, the Type-2 reactor system is a continuous, flow-through reactor system 100. For experimental work, the photosono reactor comprises a double wall quartz photoreaction vessel 50, a UV lamp 80, and an ultrasonic liquid processor 70 (Misonix Model 2020) with a custom designed (modified) cuphorn having a titanium tip with a flat radiating surface of 64 mm (2½ inches) diameter.

The double wall quartz vessel 50 was designed by the inventor, custom built with the following approximate preferred specifications: a height of 250 mm, an outer diameter of 120 mm, inlet-outlet port of a 7-mm outside diameter and 4-mm inside diameter at a height of 250 mm from the reactor bottom. The inner diameter of the immersion well is approximately 40 mm. Thus, the total volume available for the reaction is approximately 1840 mL. This is a closed vessel, designed for a continuous flow mode.

The preferred UV light source 80 used is a 100-watts mercury-vapor lamp with the following preferred specifications: 90–110 lamp volts, 1.2 lamp amps, arc length of 69.86 mm, distance from lamp to bottom is 42.86 mm, total length of 155.58 mm. The silicone lead wires, fitted with pin jacks for connecting to power supply, permit lowering of the lamp for vertical location in an immersion well.

b. The "Type-3" Reactor

Figure 4A:
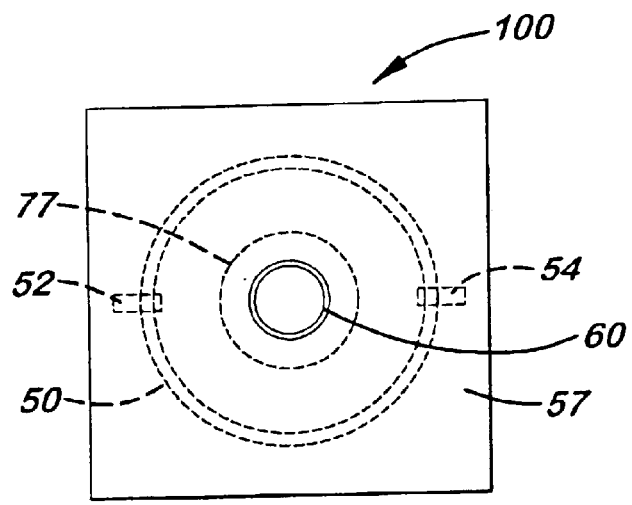
FIGS. 4A-a and 4A-b are side and top view schematic depictions, respectively, for another embodiment of the flow-through photosono reactor of the present invention.
Figure 4A:
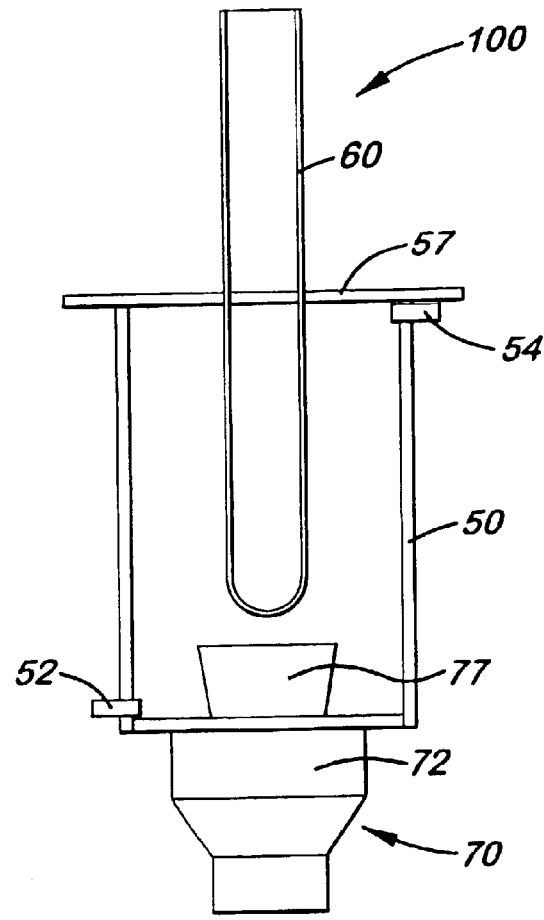

Referring to FIGS. 4A, the Type-3 reactor system is a modified version of the Type-2 flow-through reactor system. The modification was made to improve its efficiency. The reactor was modified from a commercially available cuphorn 77 (Model 431, Misonix) by increasing the depth, placing an immersion well 60 for a UV lamp and sealed the cup with a plexiglass plate 57, resulting in an approximately 2.8 L photosono reactor.

A titanium tip 72 with a flat radiating surface of 64 mm (2½ in.) diameter was used in the Type 3 system. The design of the reactor 100 allows the UV lamp to be placed into the cuphorn of the reaction vessel 77. A single immersion lamp (Model 7825, ACE Glass Inc.) is employed as a source of ultraviolet light. The UV light source used is a 100-watts, mercury-vapor lamp with the following specifications: arc length of 69.86 mm, distance from lamp to bottom is 42.86 mm, total length of 155.58 mm. The silicone lead wires, fitted with pin jacks for connecting to power supply, permit lowering of the lamp for vertical location in an immersion well 60.

Figure 4B:
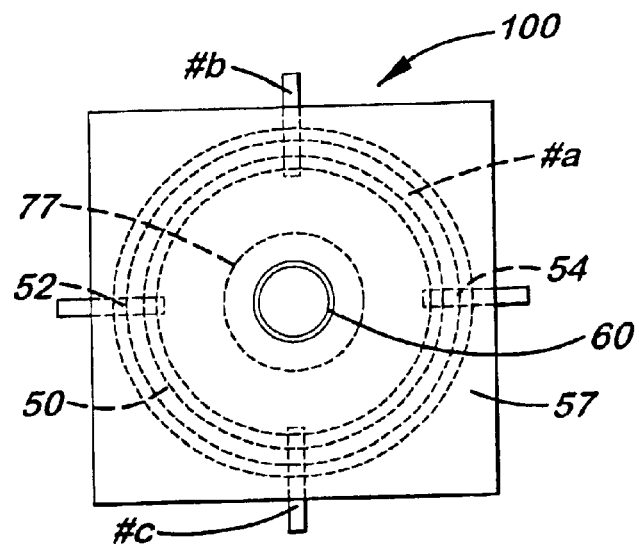
Figure 4B:
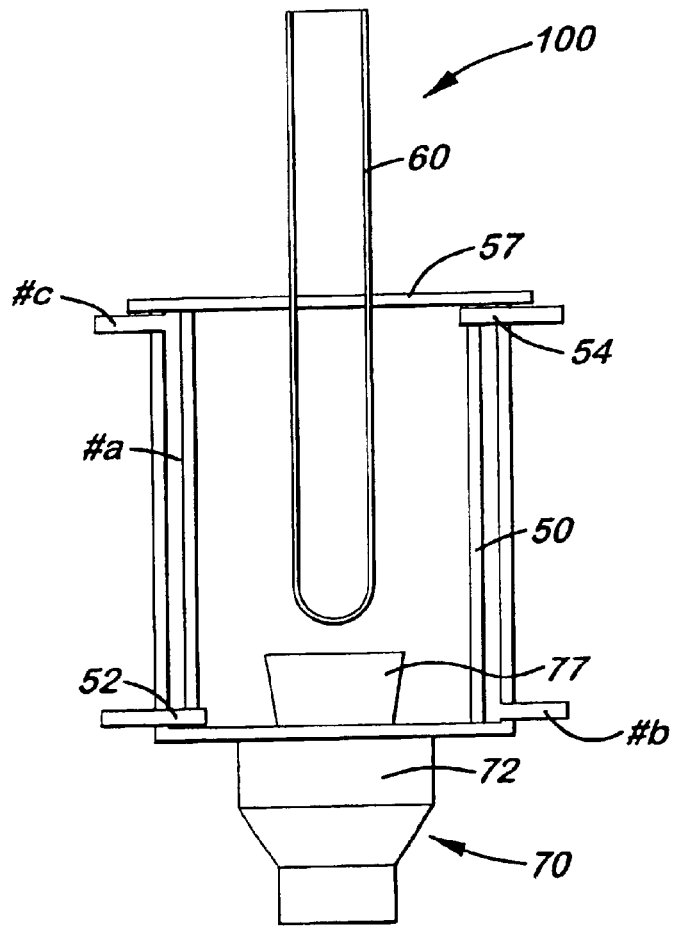

Referring to FIG. 4B, the Type-3B reactor system is modified version of Type-3A reactor system by adding a water jacket #a, an inlet port #b, and an outlet port #c. Cooled water (preferably 10±5° C.), cooled by the chiller 140 and the recirculation vessel 150 (in FIG. 1B) is supplied to an outer water jacket #a from an inlet port #b, and removed from an outlet port #c. This results in the temperature of the reactor solution being reduced to preferably less than 25° C.

c. The "Type-4" Reactor

Figure 5:
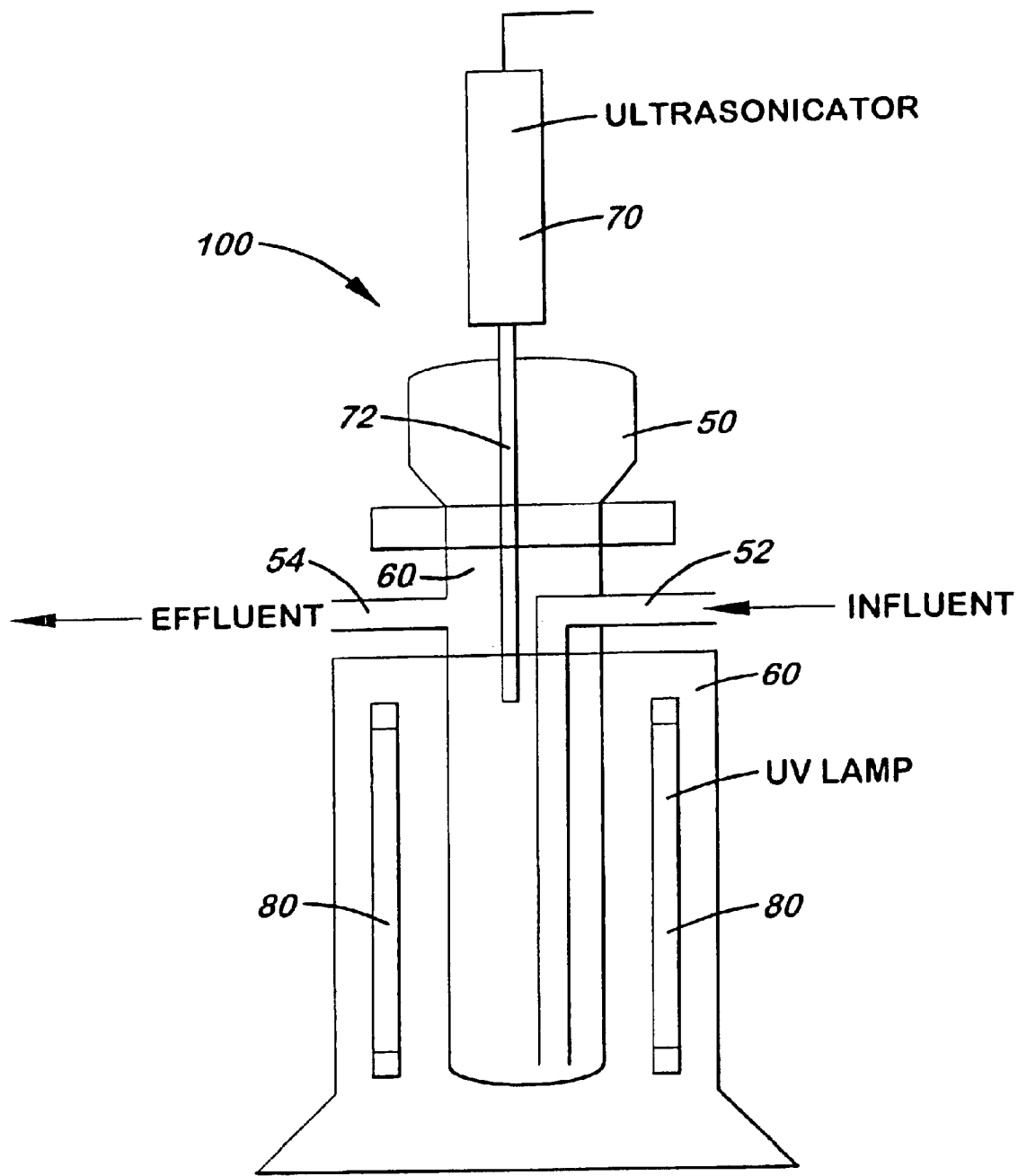
FIG. 5 is a schematic depiction for yet another embodiment of the flow-through photosono reactor of the present invention.
Figure 6:
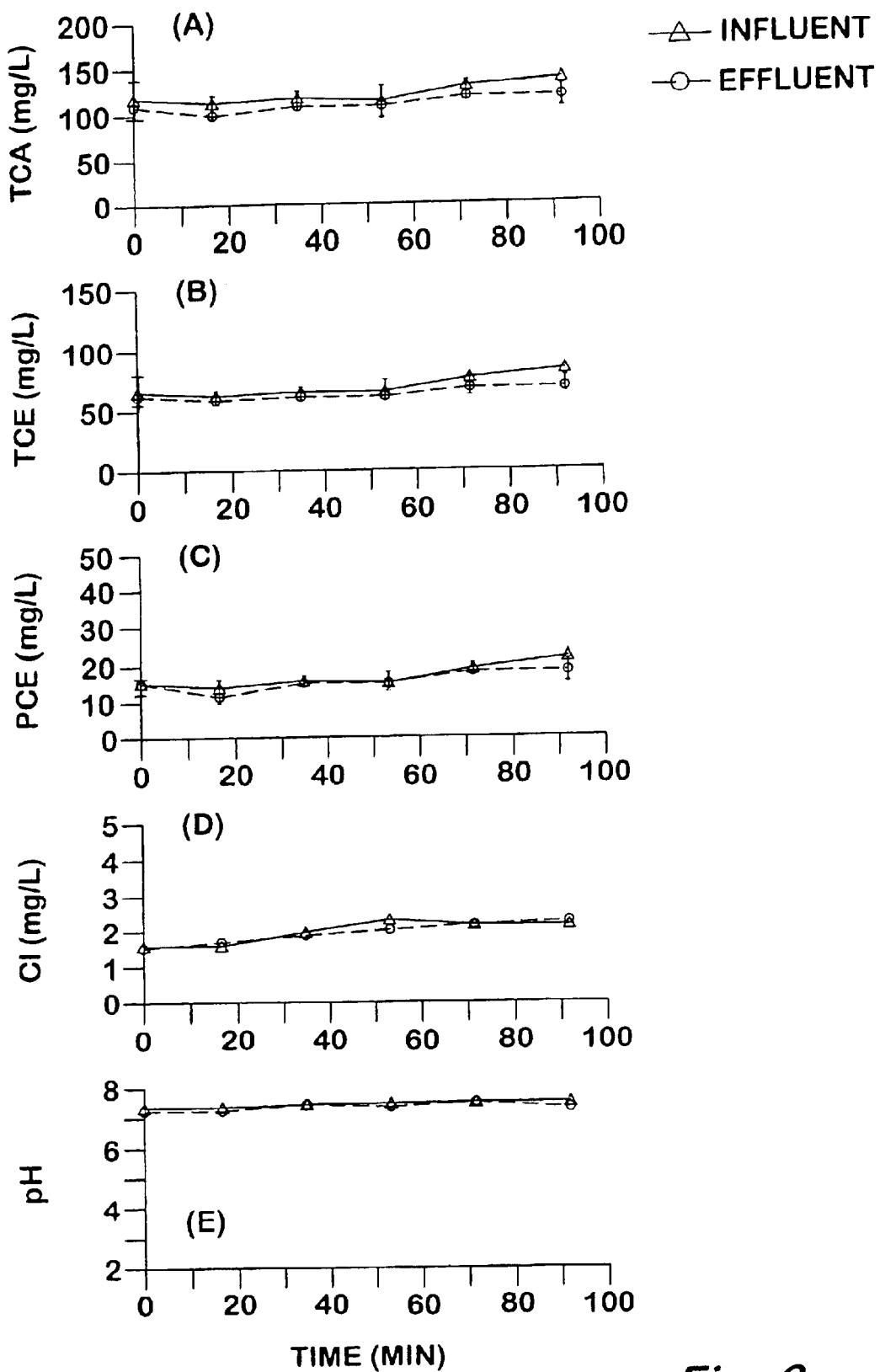
FIGS. 6–9 are graphical depictions of the results from the EXAMPLE I of this application.

As shown in FIG. 5, the Type-4 reactor system 100 is a modified version of the Type-1 batch reactor system 100. This reactor system 100 comprises a quartz reaction vessel 50, a photochemical chamber reactor 60 (Rayonet, Model RPR-100), and an ultrasonic liquid processor 70 (Misonix, Model 2020) with a ½ (one-half) inch diameter horn. The preferred quartz vessel was custom built with the following specifications: a height of 315 mm, an inner diameter of 90 mm, inlet and outlet tubes of 4 mm diameter at a height of 241.3 mm from the reactor bottom. The sonicator horn tip is submerged into the immersion well about 25.4 mm from the solution surface in the quartz reactor vessel. Total volume available for the reaction is approximately 1680 mL. This is a closed vessel, designed for a continuous flow mode. The top of the quartz reactor is sealed with a Teflon sheet. The quartz vessel is placed inside the photochemical chamber (Rayonet, Model RPR-100). The solution to be treated is UV-irradiated from the outside, and exposed to acoustic waves from inside (in the solution to be treated).

EXAMPLE I

Experimental Section

The primary objective of this study was to evaluate the combined effect of UV and US on the degradation of VOC compounds by quantifying their effects in terms of degradation rate and removal efficiency. In the present study, photolysis, sonolysis and photosonolysis of TCA, TCE, and PCE were comparatively investigated using two different types of flow-through photosonolysis reactor systems.

Materials and Solution Preparation

All chemicals used were of analytical reagent quality. 1,1,1-Trichloroethane (99+%), trichloroethylene (99.5+%), tetrachloroethylene (99.9+%), and titanium dioxide (99.9+ %, anatase) were obtained from Aldrich Chemical Co. All aqueous solutions were prepared in water purified with a Barnstead Milli-Q/RO system (R=18 MΩ-cm).

Prior to each experimental run, an 18-L solution of simulated groundwater was prepared according to Hardy and Gillham by adding the following reagent-grade salts to deionized water: 0.100 g of $MgSO_4$, 0.124 g of $CaCl_2$, 0.187 g of NaCl, and 0.303 g $NaHCO_3$. Expected concentrations of the ions are given in Table 1. For the experiments with $TiO_2$, 1.8 g of $TiO_2$ was added to 18 L of simulated groundwater, resulted in a concentration of 100 mg/L $TiO_2$.

TABLE 1

Composition of Simulated Groundwater

| Parameter | Concentration (mg/L) | (mM) |
|---|---|---|
| $Na^+$ | 8.69 | 0.378 |
| $Mg^{2+}$ | 1.12 | 0.046 |
| $Ca^{2+}$ | 2.48 | 0.062 |
| $Cl^-$ | 10.67 | 0.301 |
| $SO_4^{2-}$ | 4.41 | 0.046 |
| $HCO_3^-$ | 12.24 | 0.201 |

Equipment

Two types of photosono reactor systems, a cup-horn reactor and a probe-horn reactor, were constructed for the experiments. For both reactor systems, an ultrasonic liquid processor (Model XL2020, Misonix), capable of delivering 550 W of ultrasonic energy and producing ultrasonic waves of 20-kHz frequency was used. All of the tests were conducted in a pulse (5-sec on/off) mode. The sonicator was allowed to warm-up for 30 min prior to increasing the power to the operating frequency. The cup-horn reactor system consisted of a 2850-mL vessel equipped with ultraviolet light and ultrasound sources, a feed pump, a recirculating chiller, a cooling unit, and two collapsible containers. FIGS. 1(A–B) shows a schematic diagram of the cup-horn reactor system. A custom cup-horn vessel (Misonix) with 140-mm I.D. and 220-mm depth was modified to accomodate a UV lamp. A 100-W medium pressure, quartz, mercury-vapor lamp and a power supply (Model 7830, ACE Glass) were used as the UV source. The UV lamp was placed inside the quartz immersion well. UV intensity was measured at outer surface of the immersion well at three positions (60, 140, and 250 mm from the bottom of the well) using a UVX digital radiometer (UVP Inc.). The average radiation intensity measured at $\lambda=253.7$ nm was 5.6 $mW/cm^2$. Of total energy radiated, approximately 40 to 48% is in the ultraviolet, 40 to 43% in the visible, and the balance in the infrared portion of the spectrum. Ultrasonic waves were generated from a titanium horn with a flat 64-mm diameter radiating surface. The sonicator was operated at its maximum output setting and was typically delivering 70% of its rated power to the reactor (385 W). The UV lamp was allowed to warm up for 30 min before each experimental run. Throughout the cup-horn reactor experiment, the influent was kept at a constant temperature of 16° C. by using a recirculating chiller (Model CFT-33, Neslab) and a cooling unit. The flow rate of 100 mL/min, corresponding to a hydraulic retention time of 28.5 min, was selected.

The probe-horn reactor system consisted of a custom quartz vessel (1680 mL), a photochemical chamber, a sonicator with a probe horn, a feed pump, and two collapsible containers. FIG. 2 shows the reactor setup and the schematic of the system. The top of the custom quartz vessel was sealed with a Teflon sheet. A 12.7-mm diameter probe horn (Misonix) was placed in a solution at a depth of 25 mm from the solution surface. The photochemical chamber (Model RPR-100, Rayonet) is equipped with 16 UV light sources (peak intensity at 253.7 nm, 35 W per lamp) and a cooling fan. Only 8 lamps (total 280 W) were used in the probe-horn experiments. The lamps were allowed to warm up for 30 min before each experimental run. The intensity of UV radiation was measured at the inner surface of the empty quartz vessel at various locations using the digital radiometer. An average radiation intensity from the eight UV lamps was 4.76 mW/cm at $\lambda=253.7$ nm. The ultrasonic power output was 193 W (35% of its rated power to the reactor). The probe-horn reactor system was operated at retention times of 26 and 60 min.

Experimental Procedures

Prior to each experimental run, simulated contaminated groundwater was mixed on a shaker at 100 rpm for 1 hr. The reactor was filled with the solution and allowed to recirculate for at least 30 min to equilibrate the reactor system. A dark condition was maintained in the laboratory room by turning off all external lights and placing a cover (aluminum foil) over the whole reactor system.

After the equilibration, the effluent tubing was connected to a receiving container, and a timer was set to zero. During the course of experiments, a 20-mL sample was periodically withdrawn from the influent and effluent sampling ports for the analyses of VOCs, chloride, pH, and temperature. Of the total sample volume, 5 mL was used for pH measurement, 5 mL for chloride analysis, and three 1.5 mL samples were used for the VOC analysis.

The VOC analyses were performed using a headspace technique described by various investigators. The 1.5-mL samples were transferred into each of three 2-mL vials, followed by shaking for 20 min on a shaker. The samples were then allowed to equilibrate for 20 min in a temperature controlled chamber (Revco) at 20° C. After the equilibration, 50 L of the gas phase sample was injected into a GC. A HP 5890 Series II gas chromatograph with a Supelco SPB-5 capillary column (dia. 0.53 mm, length 30 m, and film thickness 3.0 m) was used for the analysis of each VOC constituent.

Chloride was analyzed by a chloride ion selective electrode (Fisher Accumet Model 915 pH/ISE Meter). The chloride ICE meter was calibrated daily using $Cl^-$ standard solutions. An Orion pH/ISE meter (Model 250A) was used to detect the changes in pH in inflow and effluent. All the samples were analyzed immediately following the sampling. The temperature of the influent and effluent was monitored by means of a digital thermometer (Monitoring Thermometer, Fisher Scientific).

It should be noted that the selected experimental conditions (e.g., power of ultraviolet light and ultrasound, and reactor retention time) were not intended to demonstrate high process efficiencies, but were chosen so that the individual and combined effects of UV and US could be evaluated comparatively. Since ultrasound was emitted in a 5 sec on/off pulse mode, the net US irradiation time is half of the total run time or UV irradiation time.

Results and Discussion

Photolysis, sonolysis, and photosonolysis of the VOC compounds are evaluated using the first-order degradation rate constant (k) and the removal efficiency (E). In a $UV-TiO_2$ study using a recirculating photoreactor, Glaze et al. reported that PCE and TCE degradation can be expressed using first-order kinetics. Our preliminary studies with a batch system suggested that the VOC degradation with UV and US follows pseudo first-order kinetics. A continuously stirred tank reactor (CSTR) system was assumed because the lamp emits UV light in all directions and ultrasound provides intensive mixing in the reactor vessel. A general equation at a constant flow rate may be given as:

$$\frac{dC}{dt} + \left(\frac{1}{t_d} + k\right)C = \frac{C_{in}}{t_d} \qquad (1)$$

where $C_{in}$ and $C$ are the constituent concentrations (mg $L^{-1}$) in influent and effluent, respectively. $t_d$ and k are the reactor retention time (min) and first-order degradation rate constant (min$^{-1}$), respectively. At steady state with constant $C_{in}$, solution of Eqn (1) is given as:

$$C_{ss} = \frac{C_{in}}{1+kt_d} \quad (2)$$

$$\frac{1}{C_{ss}} = \frac{1}{C_{in}} + \frac{kt_d}{C_{in}} \quad (3)$$

where $C_{ss}$ is the steady-state effluent concentration. The value of k can be determined from the slope of the $1/C_{ss}$ versus $t_d/C_{in}$ plot, or calculated using Eqn (4):

$$k = \left(\frac{C_{in}}{C_{ss}} - 1\right)/t_d \quad (4)$$

The combined effect of UV and US can be additive, antagonistic, or synergistic. The additive effect of UV and US is assumed to be summation of the k values obtained from the UV and US runs:

$$k_{ad} = k_{uv} + k_{us} \quad (5)$$

where $k_{uv}$ and $k_{us}$ are the first-order degradation rate constants (min$^{-1}$) observed for UV and US, respectively.

The UV, US, or UVUS efficiencies for the contaminant removal may be given as:

$$E = (C_{in} - C_{ss})/C_{in} \quad (6)$$

where E is the observed efficiency for a given process (UV, US, or UVUS). $C_{in}$ and $C_{ss}$ are respectively the steady-state concentrations of VOC constituent in influent and effluent. The additive effect of the UV and US may also be evaluated using the removal efficiencies by UV and US as:

$$E_{ad} = E_{uv} + E_{us}(1 - E_{uv}) \quad (7)$$

where $E_{uv}$ and $E_{us}$ are the removal efficiencies (fraction) with UV and US, respectively. $E_{ad}$ is the additive efficiency (fraction). It is postulated that, for defining the additive efficiency, a UV reactor and a US reactor are situated in series. In this study, the combined effects are defined as follows:

if $k_{uvus} = k_{ad}$ and $E_{uvus} = E_{ad}$, the combined effect is additive if $k_{uvus} < k_{ad}$ and $E_{uvus} < E_{ad}$, the combined effect is antagonistic if $k_{uvus} > k_{ad}$ and $E_{uvus} > E_{ad}$, the combined effect is synergistic where $k_{uvus}$ and $E_{uvus}$ are, respectively, the first-order degradation rate constant and removal efficiency exhibited by the UVUS run. If the observed $k_{uvus}$ value was larger than the calculated additive rate ($k_{ad}$) and the observed removal efficiency ($E_{uvus}$) was larger than the additive efficiency ($E_{ad}$), then a synergistic effect between UV and US would exist.

Figure 7:
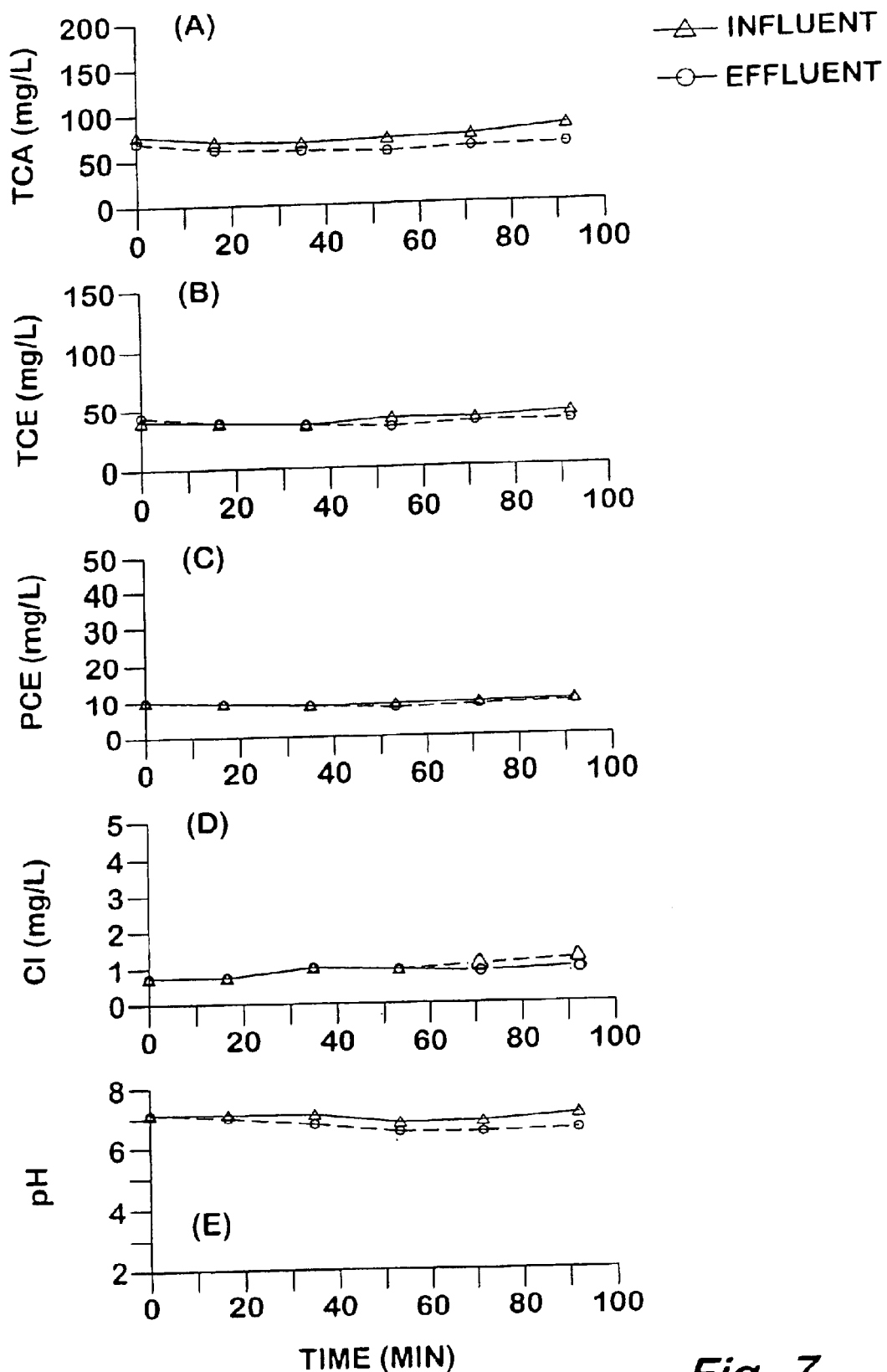
Figure 8:
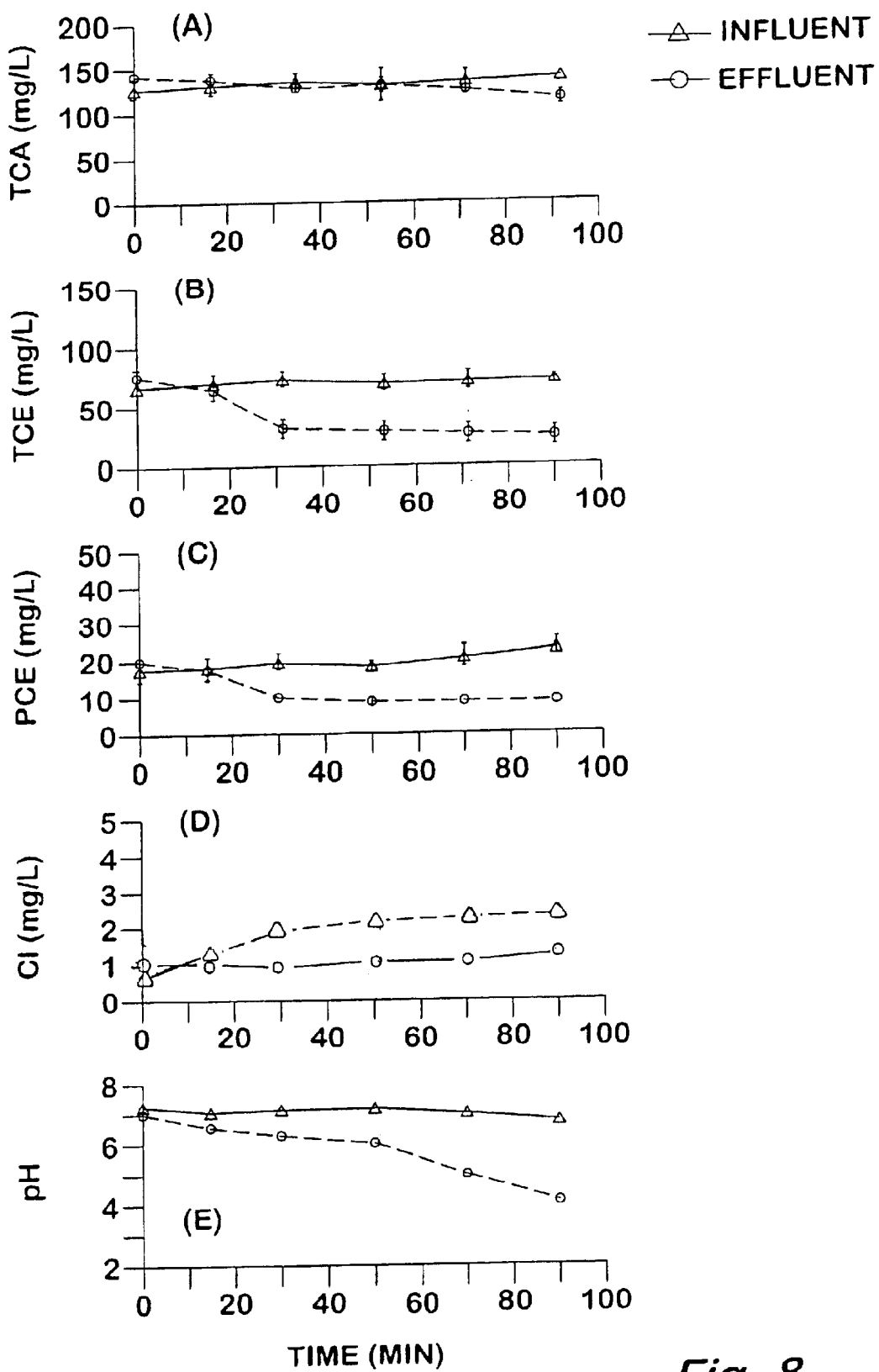
Figure 9:
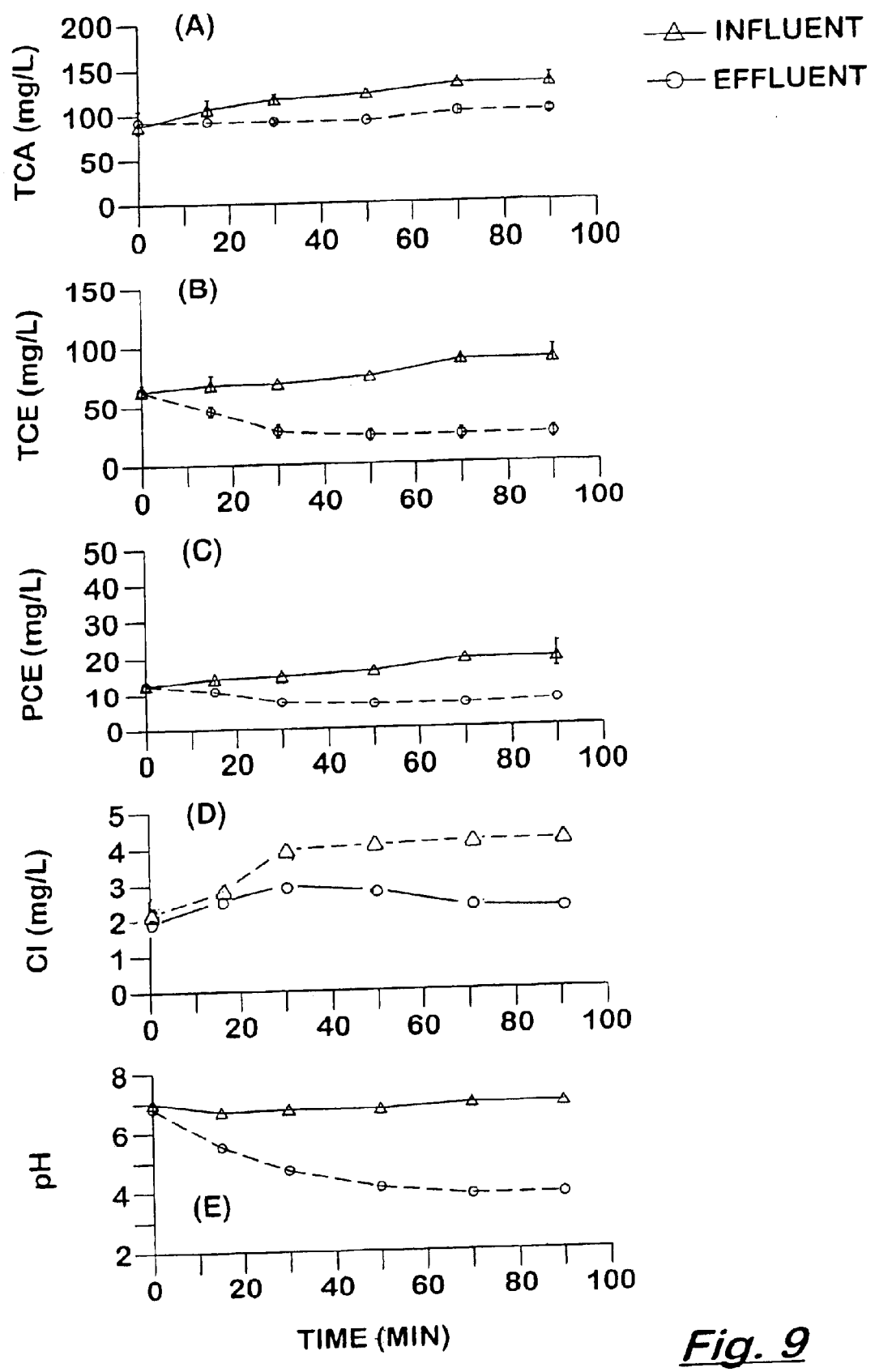

FIGS. 6 through 9 show the results of one experiment using the cup-horn photosono reactor (FIGS. 1A–B). In this experiment, simulated groundwater containing TiO$_2$ at 100 mg/L was spiked with a mixture of TCA, TCE, and PCE (VOCs). The aqueous VOC solutions were then treated with UV, US separately, and UV and US simultaneously (UVUS). The VOC compounds, chloride, and pH in influent and effluent were monitored over a 90-min run period. In the control run (FIG. 6), the concentrations of the VOC compounds in the effluent were slightly lower than those in the influent, indicating possible background losses of these compounds. Since there were little differences in the influent and effluent chloride concentrations and pH, the VOC losses were likely due to transport phenomena, probably a gas phase leakage from the reactor. In this particular experiment, US had scant effect on the degradation of the VOC compounds (FIG. 7). Although the differences in the concentrations of the VOC constituents in the influent and effluent were small, the effluent VOC concentrations were consistently lower than the influent concentrations. The slightly elevated chloride concentration and decreased pH in the effluent suggest some degradation (sonolysis) of the VOC compounds had occurred. UV had marked effects on the degradation of TCE and PCE, but little effect upon TCA (FIG. 8). The elevated chloride concentration and decreased pH in the effluent are most likely due to the degradation (photolysis or photocatalysis) of TCE and PCE. UVUS affected, to the largest extent, the decomposition of the VOC compounds, as seen in the effluent as significant decreases in the TCA concentration and pH, and an increase in the chloride concentration (FIG. 9). Results from other experiments are generally in good agreement with the above observations, and all available data were used in the evaluation of the first-order degradation rate constant (k) and the removal efficiency (E).

The values of k and E for the VOC compounds were evaluated as follows. First, a steady state period in which the influent and effluent VOC concentrations are stable was selected. Then the average influent ($C_{in}$) and effluent ($C_{ss}$) concentrations were calculated for the observed steady state period. The values of k and E for each VOC constituent and experimental condition were calculated using Eqns (4) and (6), respectively. The net removal efficiencies and degradation rate constant values were calculated by subtracting the background losses from the UV, US, and UVUS experimental results. The additive degradation rate ($k_{ad}$) and removal efficiency ($E_{ad}$) were calculated using Eqns (5) and (7), respectively, as summarized in Table 2, below.

TABLE 2

Summary of the VOC Degradation Rate Constants and Removal Efficiencies for the Cup-Horn Reactor System.

| Constituent | Process | Influent Conc. Cin (mg/L) | Degradation Rate Const. k (per min) | Removal Efficiency E (fraction) | Comment |
| --- | --- | --- | --- | --- | --- |
| TCA | UV | 139 | 0.002 | 0.043 | $K_{UVUS} > K_{td}$ |
| in VOC | US | 68 | 0.005 | 0.102 | $E_{UVUS} > E_{td}$ |
| mixture | UVUS | 138 | 0.012 | 0.209 | |
| | UV&US Additive | n/a | 0.007 | 0.140 | |

TABLE 2-continued

Summary of the VOC Degradation Rate Constants and Removal Efficiencies for the Cup-Horn Reactor System.

| Constituent | Process | Influent Conc. Cin (mg/L) | Degradation Rate Const. k (per min) | Removal Efficiency E (fraction) | Comment |
|---|---|---|---|---|---|
| TCA in VOC mixture | UV | 221 | nil | nil | $K_{UVUS} > K_{td}$ |
| | US | 68 | 0.005 | 0.102 | $E_{UVUS} > E_{td}$ |
| | UVUS | 182 | 0.006 | 0.128 | |
| | UV&US Additive | n/a | 0.005 | 0.102 | |
| TCE in VOC mixture | UV | 73 | 0.078 | 0.601 | $K_{UVUS} < K_{td}$ |
| | US | 37 | 0.002 | 0.036 | $E_{UVUS} < E_{td}$ |
| | UVUS | 87 | 0.076 | 0.598 | |
| | UV&US Additive | n/a | 0.079 | 0.615 | |
| TCE in VOC mixture | UV | 145 | 0.024 | 0.347 | $K_{UVUS} > K_{td}$ |
| | US | 37 | 0.002 | 0.036 | $E_{UVUS} > E_{td}$ |
| | UVUS | 86 | 0.039 | 0.450 | |
| | UV&US Additive | n/a | 0.026 | 0.371 | |
| PCE in VOC mixture | UV | 21 | 0.068 | 0.547 | $K_{UVUS} > K_{td}$ |
| | US | 9 | nil | nil | $E_{UVUS} > E_{td}$ |
| | UVUS | 22 | 0.071 | 0.556 | |
| | UV&US Additive | n/a | 0.068 | 0.547 | |
| PCE in VOC mixture | UV | 58 | 0.023 | 0.319 | $K_{UVUS} > K_{td}$ |
| | US | 9 | nil | nil | $E_{UVUS} > E_{td}$ |
| | UVUS | 42 | 0.048 | 0.475 | |
| | UV&US Additive | n/a | 0.023 | 0.319 | |
| TCE | UV | 46 | 0.031 | 0.416 | $K_{UVUS} > K_{td}$ |
| | US | 45 | 0.013 | 0.235 | $E_{UVUS} > E_{td}$ |
| | UVUS | 36 | 0.059 | 0.565 | |
| | UVUS | 0.24 | 0.178 | 0.764 | |
| | UVUS | 0.04 | 0.278 | 0.815 | |
| | UV&US Additive | n/a | 0.044 | 0.553 | |
| PCE | UV | 13 | 0.103 | 0.680 | $K_{UVUS} > K_{td}$ |
| | US | 10 | 0.015 | 0.264 | $E_{UVUS} > E_{td}$ |
| | UVUS | 10 | 1.481 | 0.906 | |
| | UVUS | 0.03 | 1.593 | 0.908 | |
| | UV&US Additive | n/a | 0.118 | 0.764 | | n/a, not applicable
V = 2.85 L,
UV = 100 W (5.61 mW/cm2),
US = 385 W, 100 mg/L $TiO_2$,
$t_d$ = 28.5 min.

The background losses of TCA, TCE, and PCE in the three-component mixture observed in the control run were respectively 9, 10, and 13% of the influent VOC concentrations, and occurred at rates of 0.004, 0.004, and 0.005 $min^{-1}$. Slight degradation of TCA was shown by UV ($k_{uv}$=nil, 0.002 $min^{-1}$; $E_{uv}$=nil, 4.3%). TCA was degraded by US with $k_{us}$ value of 0.005 $min^{-1}$ and $E_{us}$ value of 10.2%. UVUS yielded the considerably larger TCA degradation rates ($k_{uvus}$=0.006 and 0.012 $min^{-1}$) and removal efficiencies ($E_{uvus}$=12.8 and 20.9%). The $k_{uvus}$ and $E_{uvus}$ values are somewhat larger than the calculated additive rate constants ($k_{ad}$=0.005 and 0.007 $min^{-1}$) and efficiencies ($E_{ad}$=10.2 and 14.0%), suggesting a possible synergistic effect of UV and US on the decomposition of TCA.

TCE was degraded by UV yielding $k_{uv}$ values of of 0.024 and 0.078 $min^{-1}$ and $E_{uv}$ values of 34.7 and 60.1%. Slight decomposition of TCE was shown by US with $k_{us}$ value of 0.002 $min^{-1}$ and $E_{us}$ value of 3.6%. With UVUS, the degradation rate constant values ($k_{uvus}$=0.039 and 0.076 $min^{-1}$) and removal efficiencies ($E_{uvus}$=45.0 and 59.8%) evaluated for TCE are comparable with the calculated additive rate constants ($k_{ad}$=0.026 and 0.079 $min^{-1}$) and efficiencies ($E_{ad}$=37.1 and 61.5%). The observed UVUS effect on the TCE degradation is observed to be additive of the UV and US effects, although it could be smaller than the additive effect under certain conditions.

PCE in the three-constituent mixture was degraded by UV with $k_{uv}$ values of 0.023 and 0.068 $min^{-1}$, yielding $E_{uv}$ values of 31.9 and 54.7%. An extent of PCE degradation with US was nearly a background loss level. UVUS gave $k_{uvus}$ values of 0.048 and 0.071 $min^{-1}$ and $E_{uvus}$ values of 47.5 and 55.6%. These values are somewhat larger than the calculated additive values ($k_{ad}$=0.023 and 0.068 $min^{-1}$; $E_{ad}$=31.9 and 54.7%). Although US alone exhibited little effect on PCE degradation, it enhanced the photolysis of PCE, suggesting a possible synergistic effect of UV and US on the decomposition of PCE.

Simulated groundwater solutions containing TCE or PCE at two different concentrations were exposed to UV, US, and UVUS. TCA was not selected for the single-constituent experiments because of its poor degradability with UV, as previously shown. The results from the single-constituent runs are also presented in Table 2. Approximately 7% of the inflow TCE was lost during the control run at a rate of 0.003 $min^{-1}$. TCE was degraded by UV at a photolysis rate, $k_{uv}$, of 0.031 $min^{-1}$ yielding $E_{uv}$ value of 41.6%, while it was degraded by US at a sonolysis rate, $k_{us}$, of 0.013 $min^{-1}$ with $E_{us}$ value of 23.5%. The UVUS runs were carried out at three different concentrations. At 36, 0.24, and 0.04 mg/L TCE, the values of $k_{uvus}$ are respectively 0.059, 0.178, and 0.278 $min^{-1}$, and $E_{uvus}$ are of 56.5%, 76.4%, and 81.5%. The observed $k_{uvus}$ and $E_{uvus}$ values are consistently larger than the calculated additive rate ($k_{ad}$) of 0.044 $min^{-1}$ and the additive efficiency ($E_{ad}$) of 55.3%. Thus, the results suggest synergistic effect of UV and US on the decomposition of TCE. It should be noted that for the UVUS runs, decreasing influent concentration increased the degradation rate constant and the VOC removal efficiency. Similar trends were reported by Glaze et al. in their study with $TiO_2$-mediated photolysis of TCE and PCE.

The background loss of PCE was evaluated to be 7% of its influent concentration and occurred at a rate of 0.003 $min^{-1}$. Photolysis of PCE took place at a rate ($k_{uv}$) of 0.103 $min^{-1}$, giving a removal efficiency ($E_{uv}$) of 68.0%. PCE was degraded with US at $k_{us}$ of 0.015 $min^{-1}$ and $E_{us}$ of 26.4%. The UVUS runs were carried out at 10 and 0.03 mg/L PCE, and yielded $k_{uvus}$ value of 1.48 and 1.60 $min^{-1}$, respectively. Both the runs yielded the removal efficiency values ($E_{uvus}$) of approximately 91%. Since $E_{uvus}$ and $k_{uvus}$ values are substantially larger than what would be expected for an additive effect of UV and US ($k_{ad}$=0.118 $min^{-1}$, $E_{ad}$= 76.4%), the combined effect of UV and US on the decomposition of PCE is shown to be synergistic.

Experimental results from the probe-horn reactor study are fundamentally consistent with the cup-horn reactor results. A summary of their data analysis is given in Table 3, below.

For both the cup-horn and probe-horn systems which were run under the various conditions (with or without $TiO_2$), the order of degradability given by the values of the degradation rate and removal efficiency are PCE>TCE>TCA with UV, TCA>TCE>PCE with US, and PCE>TCE>TCA with UVUS. A photocatalysis study with a mixture of chlorobenzene, PCE, and TCA found in the literature reports that the order of degradation was chlorobenzene>PCE>TCA. The explanation given to the order was that the higher electron density of the aromatic and unsaturated compounds led to stronger adsorption on electrophilic sites at the $TiO_2$ surface. In our experiments with UV, the degradation rates of PCE and TCE were greater than that of TCA with and without $TiO_2$, suggesting that the degradation reaction that occurred in the reactors was predominantly non-catalytic photolysis.

As was mentioned earlier, experimental conditions were chosen to allow the comparisons between UV, US and UVUS. Optimization to increase reactor efficiency and obtain higher degradation rates was beyond the scope of the present work. It is expected that increasing the power of the

TABLE 3

Summary of the VOC Degradation Rate Constants and Removal Efficiencies for the Probe-Horn Reactor System.

| Constituent | Process | Influent Conc. Cin (mg/L) | Degradation Rate Const. k (per min) | Removal Efficiency E (fraction) | Comment |
|---|---|---|---|---|---|
| TCA | UV | 53 | 0.003 | 0.006 | $K_{UVUS} > K_{td}$ |
| ($t_d$ = 26 min) | US | 53 | 0.007 | 0.127 | $E_{UVUS} > E_{td}$ |
|  | UVUS | 54 | 0.019 | 0.275 |  |
|  | UV&US Additive | n/a | 0.010 | 0.176 |  |
| TCA | UV | 46 | nil | nil | $K_{UVUS} > K_{td}$ |
| ($t_d$ = 60 min) | US | 43 | 0.004 | 0.113 | $E_{UVUS} > E_{td}$ |
|  | UVUS | 43 | 0.009 | 0.218 |  |
|  | UV&US Additive | n/a | 0.004 | 0.113 |  |
| TCE | UV | 29 | 0.055 | 0.431 | $K_{UVUS} > K_{td}$ |
| ($t_d$ = 26 min) | US | 42 | 0.005 | 0.071 | $E_{UVUS} > E_{td}$ |
|  | UVUS | 34 | 0.106 | 0.556 |  |
|  | UV&US Additive | n/a | 0.059 | 0.471 |  |
| TCE | UV | 26 | 0.035 | 0.480 | $K_{UVUS} > K_{td}$ |
| ($t_d$ = 60 min) | US | 33 | nil | 0.008 | $E_{UVUS} > E_{td}$ |
|  | UVUS | 24 | 0.058 | 0.566 |  |
|  | UV&US Additive | n/a | 0.035 | 0.484 |  |
| PCE | UV | 7 | 0.524 | 0.663 | $K_{UVUS} < K_{td}$ |
| ($t_d$ = 26 min) | US | 11 | nil | nil | $E_{UVUS} < E_{td}$ |
|  | UVUS | 6 | 0.422 | 0.649 |  |
|  | UV&US Additive | n/a | 0.524 | 0.663 |  |
| PCE | UV | 5 | 4.973 | 0.618 | $K_{UVUS} > K_{td}$ |
| ($t_d$ = 60 min) | US | 11 | nil | nil | $E_{UVUS} > E_{td}$ |
|  | UVUS | 8 | 8.307 | 0.620 |  |
|  | UV&US Additive | n/a | 4.973 | 0.618 |  | n/a, not applicable
V = 1.68 L,
UV = 280 W (4.76 mW/cm2),
US = 193 W, no $TiO_2$,
$t_d$ = 26 or 60 min.

Note that $TiO_2$ was not used in all the probe-horn experiments. As expected from the previous cup-horn experiments, TCA was not effectively degraded with UV. US affected slightly the degradation of TCE. TCE was degraded more effectively by UV than US, and most significantly by UVUS. PCE was most effectively degraded by UV, while it was not affected by US. For all the cases with the probe-horn experiments, except for the PCE run at $t_d$=26 min, the $k_{uvus}$ values are greater than the $k_{ad}$ values, and the $E_{uvus}$ values are greater than the $E_{ad}$ values. The combined effect of UV and US is seen to fall in the additive to synergistic range depending on the conditions.

UV and US sources will result in higher degradation rates and removal efficiencies. Significantly high concentrations of $TiO_2$ can result in lower photocatalysis efficiency due to the interference of the solid catalyst with light penetration. Particle size and concentration of $TiO_2$ also affect the sonolysis rate. Orzechowska et al. suggested that the fine particles may enhance the rate by providing additional nuclei for bubble formation and large particles may decrease the rate because of sound attenuation. They found, however, that sand particles at various sizes and concentrations had a negligible effect on the degradation rate.

The mechanism of ultrasonic enhancement, when used in combination with $TiO_2$-photocatalysis, is thought to be due to acoustic and/or cavitational effects at the semiconductor-solution interface. At the microscopic level, the implosion of vapor bubbles near the semiconductor particle may enhance mass transport at solid surfaces, and aid in surface adsorption of the substrate. Local region of high temperature and pressure can also result in the acceleration of reactions between free radicals and the substrate. Microjets induced by cavitation may act to cleanse the catalyst surface which may become poisoned by inert byproducts. This mechanism may allow more effective adsorption and radical production, and may decrease the effective diffusion zone thickness for reactants and products. In our study, however, enhancement of the VOC photolysis by US was observed in the experiments with and without $TiO_2$ particles, suggesting that direct- or noncatalytic-photolysis was the predominant reaction. If the photolysis rate (k) is a direct function of the light intensity ($I_\lambda$) molar absorbtivity ($E_\lambda$) at wavelength $\lambda$, and quantum yield ($\phi$) of the compound of interest, the quantum yield might possibly be a cause for the observed synergism. It can be postulated that photolysis, in combination with sonolysis, initiated a chain reaction for the VOC degradation, resulting in increased quantum yield. Without more evidence, the ultrasonic enhancement mechanisms that produce the synergistic effect in the photolysis of VOC compounds remains an open question.

Since the observed effluent chloride concentrations are considerably lower than those estimated assuming complete mineralization of the VOC compounds, the dechlorination reaction is unlikely the initial step of the degradation pathways, and the possible formation of chlorinated byproducts is suggested. According to the photocatalytic mineralization pathway model for TCE and PCE, dechlorination occurs in later stages of the degradation pathway. During the photocatalysis experiments, dichloroacetic acid, dichloroacetaldehyde, trichloroacetaldehyde, and trichloroacetic acid were formed as byproducts of TCE, and dichloroacetic acid and trichloroacetic acids as byproducts of PCE. Although elucidation of photosonolysis pathway is beyond the scope of this application, the presently available results lead us to suggest that the halogenated sites of some of the target compounds are less reactive than the nonhalogenated sites, and that the reaction scheme does not lead to the immediate release of chloride ion. In our study, the GC/MS analysis indicated formation of methylene chloride and chloroform or structurally similar compounds during the photosonolysis of PCE and TCE, suggesting double-bond cleavage as one of the primary degradation pathways. Elucidation of the degradation pathway of these compounds is underway to gain a better understanding of photosonocatalysis.

In summary, this study demonstrated photosonolysis of TCA, TCE, and PCE in simulated groundwater using the cup-horn and probe-horn reactor systems. The values of the first-order degradation rate constant ($k_{uv}$, $k_{us}$, $k_{uvus}$) and the removal efficiency ($E_{uv}$, $E_{us}$, $E_{uvus}$) for the VOC compounds were evaluated for the UV, US, and UVUS treatments. The $k_{uvus}$ values were compared to the $k_{ad}$ values calculated from the sum of the rate constants under the individual UV and US irradiation ($k_{ad}=k_{uv}+k_{us}$), and the $E_{uvus}$ values were compared to the calculated $E_{ad}$ values, $E_{ad}=E_{uv}+E_{us}(1-E_{uv})$. The concurrent use of UV and US increased, in most cases, the VOC degradation rate constant and removal efficiency beyond the additive effect of UV and US. The results suggest that the combination of UV and US can create synergistic effects on the decomposition of VOCs in water.

EXAMPLE II

Introduction

This section reports findings by the inventor that: 1) an aluminum partition installed in the UVUS reactor increases the efficiency of the VOC (PCE, TCE) removal relative to a stainless steel partition; and 2) the aluminum partition enhances synergistic effect of UV and US on the removal of VOC relative to a stainless steel partition.

The newly developed reactor vessel consists of a UV lamp compartment, a US horn compartment, and a partition compartment. The partition compartment is a removable compartment made of either aluminum (AL) or stainless steel (SS). Data on photosonolysis of VOC obtained from the experiments using the reactor having the AL partition are compared to those from the experiments using the reactor with the SS partition. Stainless was used as control material.

This paper adapts the following notation: PCE=tetrachloroethylene, TCE=trichloroethylene, VOC=chlorinated volatile organic compounds (particularly PCE and TCE in this paper), UV=ultraviolet light or the ultraviolet light run, US=ultrasound or the ultrasound run, UVUS=the combination of UV and US, AL=aluminum or the reactor with the aluminum partition, SS=stainless steel or the reactor with the stainless steel partition, and UP=upflow scheme.

Experimental Methods

The reactor system setup is illustrated in FIG. 10. The UVUS reactor system consists of a three-compartment reactor vessel, a feed pump, two collapsible containers, and a shaker.

Design of the Three-Compartment UVUS Reactor

A 4.1-L reaction vessel was custom designed and manufactured by commercial Plastics & Supply Co. (Salt Lake City, Utah). The vessel can be separated into a UV compartment and a US compartment by installing the partition. The partition was made by welding two round sheets (of aluminum or stainless steel) together (see FIG. 11). The dimension of each sheet was 200-mm diameter and 3.2-mm thickness. The conduit height in the plate was 60 mm and the volume of the inner space between the two sheets (i.e., the partition compartment volume) was 90 mL.

A cup-horn ultrasonic liquid processor (XL 2020, Misonix, Farmingdale, N.Y.) was used as US source. The rated maximum ultrasonic power was 550 W at 20 kHz output frequencies. A model 7825 medium pressure, quartz, mercury-vapor immersion lamp (100 watts) with a power supply (7825-30 power supply, ACE Glass inc., Vineland, N.J.) was employed as a UV source. The total radiated energy was 11.49 watts. Approximate 40% is located in the ultraviolet region of the spectrum, 41% is in visible region, and the remaining belongs to infrared region. Irradiance was measured by a UVX digital radiometer (UVP Inc., San Gabriel, Calif.).

A Masterflex Pump (Model 7553-71, Cole-Parmer Instrument Company, Niles, Ill.) was used to feed aqueous solution into the reactor. Two collapsible containers (Cole-Parmer Instrument Co., Vernon Hills, EL) were used as a reservoir for the feed solution and a container to receive treated solution. A shaker (Model G-33, New Brunswick Scientific Company, Edison, N.J.) was used to agitate feed solution for obtaining uniform constituent concentration.

Experimental Conditions

All experiments were carried out using a flow-through UVUS reactor with a partition made of AL or SS. Using the partition, the reactor was divided into a UV lamp compartment, a US horn compartment, and a partition compartment; thus, the investigations of the effects of UV and US can be conducted either separately, series, or concurrently. In this study, all experimental runs were conducted in an upflow, from the US compartment to the UV compartment (US→UV), scheme.

The sonicator was operated in a pulse (5-second on/off) mode. The ultrasonic power delivered into the aqueous solution was approximately 330 W (delivered 60% of the rated power) at 20 kHz output frequencies. The power of the UV lamp employed was 100 watts. The average radiation intensity employed at λ=253.7 nm was 16.1 mW/cm² for the TCE experiment and 10.6 mW/cm² for the PCE experiment. The flow rate of 100 mL/min, corresponding to the total hydraulic retention time of 41 min (30 min for the UV compartment, 11 min for the US compartment, 50 sec for the partition compartment), was maintained for all experimental runs.

Experimental Procedures

The experiments consisted of TCE and PCE runs. All the chemicals were used as received. A 20-L solution containing TCE or PCE was prepared in a feed solution container and uniformly mixed for 30 min on the shaker at 100 rpm. The solution was filled into the reactor system and allowed to recirculate until the system reached equilibrium (about 60 min). After the equilibration period, the effluent was discharged into a receiving container. The flow rate was adjusted to 100 mL/min. When the UV lamp, the US sonicator, or both were turned on (except for the control run), the timer was set to zero for each experiment.

During each experimental run, a 20-mL sample was withdrawn at times 0, 3, 5, 10, 20, 30, 60, 90 min from the influent and effluent sampling ports for the analyses of TCE, PCE, chloride, and pH. Temperatures of influent and effluent solutions were recorded at each sampling time. All samples from the experiments were analyzed in the lab immediately after each sampling (or experimental run). Analysis of TCE and PCE was performed using a BP 5890 Series II gas chromatograph (GC) with a DB-624 capillary column (diameter 0.32 mm, length 30 m, and film thickness 1.8 μm, J&W Scientific, Folsom, Calif.) and an Electron Capture Detector (ECD).

Results

The effect of the partition material on the photosoriolysis of PCE and TCE in the UVUS reactor, was examined. The reactor efficiencies ($E_3$=Euvus) for the removal of VOC in the UVUS runs are computed using Eqns. (1)' and (2)'.

$$E_3 \frac{C_{in} C_{ss3}}{C_{in}} = 1 - \frac{C_{ss3}}{C_{in}} \quad (1)'$$

$$E_3 = \left[1 - \frac{1}{(1+k_1 t_{d1})(1+k_2 t_{d2})(1+k_3 t_{d3})}\right] \quad (2)'$$

where $E_3$=Euvus =the removal efficiencies based on the effluent of the third compartment of the reactor at steady state; $t_{d1}$, $t_{d2}$, and $t_{d3}$=the mean retention time (mm) for the first, second, and third compartment, respectively; $k_1$, $k_2$, and $k_3$=the degradation rate constants (min⁻¹) in the first, second, and third compartment, respectively(=$k_{us}$, $k_{pc}$, and $k_{us}$, respectively). The effect of the partition compartment on the overall efficiency was assumed to be insignificant due to its small retention time ($t_{d2}$=50 sec).

The theoretical additive removal efficiencies ($E_{ad}$) were calculated using Eqn. (3)'.

$$E_{ad}=E_{us}+(1-E_{us})E_{uv} \quad (3)'$$

where $E_{ad}$=the additive removal efficiency; $E_{uv}$=the removal efficiency with UV irradiation; and $E_{us}$=the removal efficiency with US irradiation. If $E_{uvus}$=$E_{ad}$, the combined effect is additive; if $E_{uvus}$>$E_{ad}$, the combined effect is synergistic; if $E_{uvus}$<$E_{ad}$, the combined effect is antagonistic. $E_{uvus}$=the removal efficiency with UVIJS irradiation.

Figure 12:
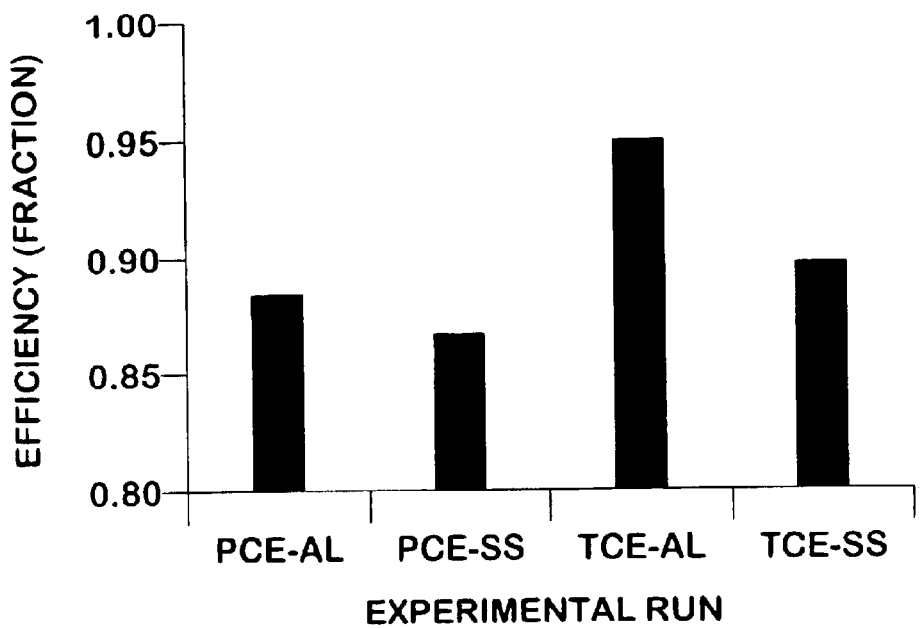
FIGS. 12 and 13 are graphical depictions of the results from EXAMPLE II of this application.

The reactor efficiencies ($E_{uvus}$) for the removal of PCE and TCE are presented in Table 1' and shown graphically in FIG. 12 As seen, for both PCE and TCE, the combined effect of UV and US is greater with the AL partition than that with the SS partition (control).

Figure 13:
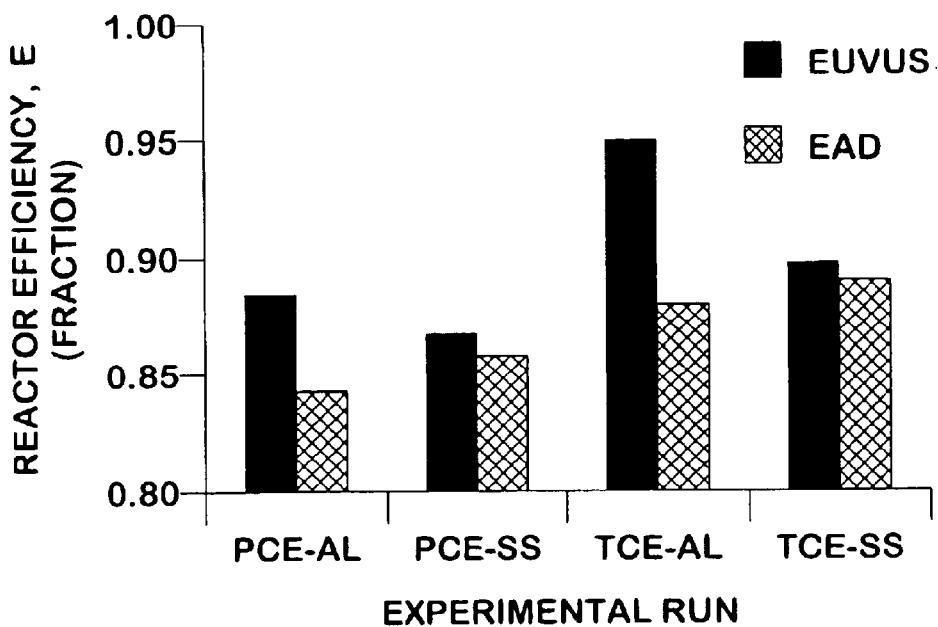

The observed removal efficiencies ($E_{uvus}$) and the theoretical additive efficiency ($E_{ad}$) for the removal of PCE and TCE are presented in Table 2'. FIG. 13 gives a comparison between $E_{uvus}$ and $E_{ad}$ obtained from the AL-UP and SS-UP runs with PCE and TCE. It is seen for both PCE and TCE that the observed removal efficiencies ($E_{uvus}$) are greater than the corresponding theoretical additive removal efficiency ($E_{ad}$) in both the AL and SS runs. The difference between $E_{uvus}$ and $E_{ad}$ is more distinct with the AL partition. The result suggests that the synergistic effect of UV and US on the decomposition of VOC is enhanced by the AL partition.

Conclusions

1) An aluminum partition increases the UVUS reactor efficiency for the removal of VOC (PCE, TCE) relative to a stainless steel partition.
2) An aluminum partition enhances synergistic effect of UV and US on the removal of VOC in the UVUS reactor relative to a stainless steel partition.

TABLE 1

Reactor efficiencies (Euvus) for the removal of PCE and TCE

| Experimental Run | Efficiency, Euvus (fraction) |
|---|---|
| PCE-AL | 0.884 |
| PCE-SS | 0.867 |
| TCE-AL | 0.951 |
| TCE-SS | 0.897 |

AL, aluminum
SS, stainless steel

TABLE 2

Comparison between the observed efficiency (Euvus) and the theoretical additice efficiency (Ead) for the decomposition of PCE and TCE

| Experimental Run | Euvus | Ead |
|---|---|---|
| PCE-AL | 0.884 | 0.843 |
| PCE-SS | 0.867 | 0.859 |
| TCE-AL | 0.951 | 0.881 |
| TCE-SS | 0.897 | 0.892 |

AL, aluminum
SS, stainless steel

Although this invention has been described above with reference to particular means, materials and embodiments, it is to be understood that the invention is not limited to these disclosed particulars, but extends instead to all equivalents within the scope of the following claims.

I claim:

1. A photosololysis reactor, comprising a generally cylindrical vessel with an immersion well inside said vessel, said immersion well being transparent to ultraviolet light, an ultraviolet light source within said immersion well, an ultrasound source also inside said vessel, and a metal partition with a reactant flow-through hole also inside said vessel.

2. The reactor of claim 1 which also comprises inlet and outlet ports for fluid to flow through said reactor.

3. The reactor of claim 1 wherein the metal partition is between said immersion well and said ultrasound source.

4. The reactor of claim 1 wherein the metal partition is aluminum.

5. The reactor of claim 1 wherein the metal partition is stainless steel.

6. A photosonolysis reactor comprising a generally cylindrical vessel with side walls which are transparent to ultraviolet light, an ultrasound source inside said vessel, an ultraviolet light source outside of, and in operative relationship with, said vessel, and a metal partition with a reactant flow-through hole also inside said vessel.

7. The reactor of claim 6 which also comprises inlet and outlet ports for fluid to flow through said reactor.

8. The reactor of claim 6 wherein the metal partition is between the transparent side walls and the ultrasound source inside said vessel.

9. The reactor of claim 6, wherein the metal partition is aluminum.

10. The reactor of claim 6 wherein the metal partition is stainless steel.

11. A photosonolysis reactor comprising a generally cylindrical vessel with an immersion well inside said vessel, said immersion well being transparent to ultraviolet light, an ultraviolet light source within said immersion well, an ultrasound source outside of, but in operative relationship with, said vessel, and a metal partition with a reactant flow-through hole also inside said vessel.

12. The reactor of claim 11 which also comprises inlet and outlet ports for fluid to flow through said reactor.

13. The reactor of claim 11 wherein the metal partition is between the immersion well and the ultrasound source.

14. The reactor of claim 11, wherein the metal partition is aluminum.

15. The reactor of claim 11, wherein the metal partition is stainless steel.

16. A method for decomposing halogenated organic compounds in water, which comprises simultaneously contacting the water and halogenated organic compounds with ultraviolet light and ultrasonic waves in a reactor vessel, said ultraviolet light being from a source within an immersion well transparent to ultraviolet light in said water in said reactor vessel, and there being a metal partition with a reactant flow-through hole also within said reactor vessel.

17. A method for decomposing halogenated organic compounds in water, which comprises simultaneously contacting the water and halogenated organic compounds in a reactor vessel with ultraviolet light and ultrasonic waves, said ultraviolet light being from a source outside of said reactor vessel, and there being a metal partition with a reactant flow-through hole also within said reactor vessel.

18. A method for decomposing halogenated organic compounds in water, which comprises simultaneously contacting the water and halogenated organic compounds with ultraviolet light and ultrasonic waves, said ultraviolet waves being from a source outside of said water, and there being a metal partition with a reactant flow-through hole also in said water.

* * * * *